(12) United States Patent
Simon

(10) Patent No.: US 12,288,364 B2
(45) Date of Patent: Apr. 29, 2025

(54) METHOD FOR PROVIDING CALIBRATION DATA FOR CALIBRATING A CAMERA, METHOD FOR CALIBRATING A CAMERA, METHOD FOR PRODUCING AT LEAST ONE PREDEFINED POINT-SYMMETRIC REGION, AND DEVICE

(71) Applicant: Robert Bosch GmbH, Stuttgart (DE)

(72) Inventor: Stephan Simon, Sibbesse (DE)

(73) Assignee: ROBERT BOSCH GMBH, Stuttgart (DE)

( * ) Notice: Subject to any disclaimer, the term of this patent is extended or adjusted under 35 U.S.C. 154(b) by 98 days.

(21) Appl. No.: 18/251,815

(22) PCT Filed: Oct. 15, 2021

(86) PCT No.: PCT/EP2021/078610
§ 371 (c)(1),
(2) Date: Jun. 12, 2023

(87) PCT Pub. No.: WO2022/100959
PCT Pub. Date: May 19, 2022

(65) Prior Publication Data
US 2024/0013437 A1    Jan. 11, 2024

(30) Foreign Application Priority Data
Nov. 12, 2020  (DE) .................... 10 2020 214 250.5

(51) Int. Cl.
*G06T 7/80* (2017.01)
*G06T 7/30* (2017.01)
*G06T 7/68* (2017.01)

(52) U.S. Cl.
CPC ................ *G06T 7/80* (2017.01); *G06T 7/30* (2017.01); *G06T 7/68* (2017.01); *G06T 2207/30208* (2013.01)

(58) Field of Classification Search
CPC .... G06T 7/30; G06T 7/33; G06T 7/68; G06T 7/80; G06T 2207/30208
See application file for complete search history.

(56) References Cited

U.S. PATENT DOCUMENTS

2002/0057345 A1    5/2002  Tamaki et al.

FOREIGN PATENT DOCUMENTS

DE    102020202160 A1    8/2021

OTHER PUBLICATIONS

Jiang et al. "Detection of Concentric Circles for Camera Calibration" Tenth IEEE International Conference on Computer Vision (2005) ; pp. 1-8.

(Continued)

*Primary Examiner* — Michael B. Pierorazio
(74) *Attorney, Agent, or Firm* — NORTON ROSE FULBRIGHT US LLP; Gerard A. Messina

(57) ABSTRACT

A method for providing calibration data for calibrating a camera. The method includes reading in image data provided by the camera from the camera. The image data represent a camera image of at least one predefined point-symmetric region. The method also includes determining at least one center of symmetry of the at least one point-symmetric region using the image data and a determination rule, performing a comparison of a position of the center of symmetry in the camera image with a predefined position of a reference center of symmetry in a reference image in order to determine a positional deviation between the center of symmetry and the reference center of symmetry, and ascertaining displacement information for at least a subset of pixels of the camera image relative to corresponding pixels of the reference image, using the positional deviation. The calibration data are provided using the displacement information.

17 Claims, 12 Drawing Sheets

(56) References Cited

OTHER PUBLICATIONS

Marita et al. "Camera Calibration Method for Far Range Stereovision Sensors Used in Vehicles" Intelligent Vehicles Symposium (2006); pp. 356-363.
Gao et al. "A Novel Kinect V2 Registration Method for Large-Displacement Environments Using Camera and Scene Constraints" IEEE (2017); pp. 997-1001.
Dao et al. "A Robust Recognition Technique for Dense Checkerboard Patterns" 2010 International Conference on Pattern Recognition, IEEE (2010); pp. 3081-3084.
International Search Report for PCT/EP2021/078610, Issued Mar. 15, 2022.

METHOD FOR PROVIDING CALIBRATION DATA FOR CALIBRATING A CAMERA, METHOD FOR CALIBRATING A CAMERA, METHOD FOR PRODUCING AT LEAST ONE PREDEFINED POINT-SYMMETRIC REGION, AND DEVICE

FIELD

The present invention relates to a device and a method of the providing calibration data for a camera, and calibrating a camera. The present invention also relates to a computer program.

BACKGROUND INFORMATION

In the field of camera calibration, for example targets having simply constructed black and white patterns can be used, which are mostly constructed from squares or circles. In particular, checkerboard patterns or regularly configured circles can often be used, e.g., black circles configured in a grid pattern on a white background or vice versa.

German Patent Application No. DE 10 2020 202 160 A1 describes a method for determining a symmetry property in image data and a method for controlling a function.

SUMMARY

The present invention provides a method, and in addition a device which uses this method, and a corresponding computer program. Advantageous developments and improvements of the present invention are possible through the measures disclosed herein.

According to specific embodiments of the present invention, if points or objects in the world are marked using point-symmetric regions, this can in particular be exploited in such a way that a system with an imaging sensor and a suitable method presented herein can robustly and locally detect and localize these point-symmetric regions with high precision in order to carry out a specific technical function, optionally without humans or living beings perceiving such markings as disturbing.

For example, it may occur that a symmetrical region is not fully mapped into the camera image, e.g., because it may be partially obscured by an object, or because it may partially protrude from the image, or because the pattern may have been cropped. Advantageously, a precision of a localization of the point center of symmetry can nonetheless be maintained, because the partial occlusion(s) do not falsify its position: remaining point-symmetric correspondence pairs may still support the correct center of symmetry. Partial occlusion can merely reduce a strength of a cluster point in a voting matrix or the like, but the position of the center of symmetry can be preserved and nonetheless still be precisely and easily determinable. This is a specific advantage of exploiting point symmetry.

Further advantages in finding regions or patterns based on point symmetry can result in particular from the fact that point symmetry is invariant to rotation between the point-symmetric region and the camera or image capture, and is largely invariant to a perspective. For example, a point-symmetric plane surface may be invariant to an affine mapping. A mapping of an arbitrarily oriented plane by a real camera can always be approximated very well, at least locally, by an affine mapping. For example, if a circular point-symmetric region is viewed from an oblique perspective, the circular shape becomes an elliptical shape, while the point-symmetric property and center of point symmetry are preserved. Thus, the at least one point-symmetric region does not necessarily have to be viewed from a frontal perspective—even very oblique perspectives do not present any difficulty, and an achievable accuracy can be maintained. Such invariance, particularly to rotation and to perspective, can make it possible to do without the precautions of aligning the camera suitably to the symmetrical region or vice versa. Rather, it can already be sufficient if the respective point-symmetric region is at least partially acquired in the camera image so that it can be detected. A relative positional relationship or configuration between the point-symmetric region and the camera can be insignificant or almost insignificant here.

According to an example embodiment of the present invention, with regard to a camera calibration, advantageously in particular a true two-dimensional instead of one-dimensional utilization of a surface available for the at least one point-symmetric region can be achieved. Unlike conventional black-and-white calibration targets, for example, more information can be contained in the point-symmetric regions because a larger portion of their two-dimensional surface can be utilized to accommodate information therein. In the case of conventional black and white calibration targets, the information they contain is usually only of a one-dimensional nature, because it is contained in particular in the lines that result from a black surface and a white surface abutting each other. In such checkerboard patterns, this results in straight lines whose intersection points represent so-called outstanding points that can be used for calibration. In the case of circular surfaces as targets, at the edges there arise circles whose centers yield the outstanding points. Thus, only (one-dimensional) lines contribute to the outstanding points. In other words, the surface of the target is utilized only to a reduced extent. In contrast, according to specific embodiments, in particular depending on the design of the region or pattern, any point, assuming a found symmetry partner, on the entire surface can contribute to the ascertaining of a center of symmetry. The center of symmetry here represents an outstanding point in the above sense. An entire surface can contribute to this. The more pairs of points that contribute to the formation of the center of symmetry, the more strongly and thus more unambiguously it can be mapped, for example in a voting matrix, thus achieving a reliable detection and a low risk of false detections, and the more precisely it can be localized (with high accuracy in the sub-pixel range), since it can stand out more strongly from noise. In other words, the proposed symmetric regions and/or patterns can effectively utilize an available surface in two dimensions and can convert this into advantages with regard to accuracy and robustness. It can also be advantageous to avoid extreme regions and HDR effects of the camera. Unlike conventional work with black and white patterns, with regard to a camera characteristic curve or a camera signal, depending on the brightness at the respective pixel work at extreme points can be avoided, which would be unfavorable because the characteristics of the camera are quite different in the dark and bright regions.

The above-named facts are illustrated in the following on the basis of some simple considerations. Light is made up of photons. From the camera's point of view, black means the absence of photons, while white means many photons impinge per area. A pixel (in the sense of the light-sensitive element of the camera sensor) can only accept a limited number of photons (saturation capacity). This can result in non-linear effects, up to saturation effects, in the bright region. The noise of a modern image sensor can be determined almost exclusively by the number of photons arriving at the pixel. In the dark region (few photons), the absolute noise can be low, but the relative noise (with respect to brightness) can be high. In the bright region (many photons), the absolute noise can be high, but the relative noise can be low. In this respect, black and white image regions may behave differently. Scattered light effects in the optical path can cause bright image regions to spill over into adjacent dark image regions, but not vice versa. Likewise, unsharpness effects may occur due to poor lens characteristics or faulty focusing. Here as well, light regions can smear into dark regions, but not vice versa. A combination of blurring (regardless of the reason) and saturation in the bright region can cause the bright saturated regions to spill over into the dark regions, making the outstanding points undetectable in the case of a traditional checkerboard pattern.

Many modern cameras use HDR (High Dynamic Range) modes in particular to increase their dynamic range. Particularly widely used is temporal HDR, in which a plurality (e.g. 3) of image captures with different exposure times are taken in quick succession and the partial images are internally computed to form one image. Differently bright image regions then originate from different partial images. For example, the darkest regions, e.g. black squares of the checkerboard, originate from the temporally first partial image and the lightest regions, e.g. white squares of the checkerboard, from the temporally last partial image. If the camera were to move relative to the target in the meantime, there would be local shifts in the image between the light and dark regions of the target. The effects would be particularly dramatic at light-dark edges, where all mixed forms can occur. Such images may be unsuitable for a precise calibration, because the outstanding points can no longer be precisely determined. In local HDR, large or sensitive pixels alternate with small or insensitive pixels on the sensor. This can lead to systematic inaccuracies in the determination of the outstanding points, because the pixels responsible for light regions and those responsible for dark regions are located in different places.

Such above-mentioned undesirable effects can be avoided or at least mitigated with the point-symmetric regions and/or patterns proposed herein. By design, the regions/or patterns can have approximately an equal distribution of brightnesses. All shades of gray between a lightest and a darkest gray value, each configurable, can occur approximately equally in the region or pattern. True black and true white can be avoided altogether in order to be able to avoid non-linear effects from the outset, in particular when printing the patterns, but also during image acquisition and camera-internal image pre-processing. The regions and/or the patterns can for example be produced, for example printed, in a resolution that is at least as high as a resolution power of the camera when the region or the pattern is located in front of the camera so as to fill the image. If the region and/or pattern is further away from the camera, i.e. is no longer image-filling, the resolution of the region and/or pattern is more than sufficient. Due to an existing unsharpness of the image in the optical path (through the lens, the image sensor and, depending on the camera version, the optional anti-aliasing filter in front of the image sensor), the point-symmetric region or pattern can thus be smoothed. In this smoothing, a distribution of the gray values changes: The original uniform distribution can tend to become a normal distribution whose center of gravity lies in the middle gray value range. As a result, the camera can operate in its medium sensitivity range, for which it is optimized, and artifacts can be avoided in dark and in particular in the bright extreme regions of the camera.

According to an example embodiment of the present invention, a method for providing calibration data for calibrating a camera is provided. The method includes the steps:

Reading in image data provided by the camera from an interface to the camera, the image data representing a camera image of at least one predefined even and/or odd point-symmetric region in a vicinity of the camera;

Determining at least one center of symmetry of the at least one even and/or odd point-symmetric region using the image data and a determination rule;

Performing a comparison of a position of the at least one center of symmetry in the camera image with a predefined position of at least one reference center of symmetry in a reference image relative to a reference coordinate system in order to determine a positional deviation between the center of symmetry and the reference center of symmetry; and Ascertaining displacement information for at least a subset of pixels of the camera image relative to corresponding pixels of the reference image using the positional deviation, the calibration data being provided using the displacement information.

This method can be implemented for example in software or hardware, or in a mixed form of software and hardware, for example in a control unit or device. The at least one predefined point-symmetric region can be produced by carrying out a variant of a production method described below. The determination rule may resemble or correspond to a procedure described in German Patent Application No. DE 10 2020 202 160. The reference image can represent the at least one predefined point-symmetric region. The reference image can also be replaced by reference data that at least partially correspond to or are equivalent to the information that can be obtained from a reference image. Working with reference data can be advantageous, especially in terms of reduced effort, if the information that can be extracted from a reference image is already available in a more easily usable form in the form of the reference data. The reference data can represent the reference image in a condensed form or representation, for example as a descriptor image, signature image, and/or with a listing of all coordinates and types of centers of symmetry that are present. The ascertaining step can be carried out using the optical flow, in particular the dense optical flow. The displacement information can represent displacement vectors or absolute coordinates.

According to a specific embodiment of the present invention, the determination rule used in the step of determining can be designed to cause a signature to be generated for a plurality of pixels of at least a segment of the camera image in order to obtain a plurality of signatures. Here, each of the signatures can be generated using a descriptor with a plurality of different filters. Each filter can have at least one type of symmetry. Each of the signatures can have a sign for each filter of the descriptor. The determination rule can also be designed to cause at least one mirror signature to be ascertained for the signature for at least one type of symmetry of the filters. The determination rule can in addition be designed to bring it about that a pixel having the signature is checked for a presence of at least one further pixel having a signature corresponding to the at least one mirror signature in a search region in a vicinity around the pixel, in order to ascertain, if there is at least one further pixel, pixel coordinates of at least one symmetric signature pair from the pixel and a further pixel. In addition, the determination rule can be designed to cause the pixel coordinates of the at least one symmetric signature pair to be evaluated in order to identify the at least one center of symmetry. The descriptor can describe an image content in a local environment around a pixel or reference pixel in a compact form. A signature can describe a value of the descriptor for a pixel, for example in a binary representation. Thus, the at least one mirror signature can be ascertained using multiple calculated signature images, e.g. one with normal filters, one with even point-mirrored filters, and one with odd point-mirrored filters. Additionally or alternatively, at least one reflector can be applied to the sign of one of the signatures in order to ascertain the at least one mirror signature. Here, each reflector for a symmetry type can have specific rules for modifying the sign that are a function of the filters of the descriptor. Here the search region may be a function of at least one of the reflectors used. Such an embodiment offers the advantage of enabling an efficient and accurate detection of a symmetry property in image data. In this way, the detection of symmetries in images can be achieved with minimal effort.

In this context, in the step of determining, for each already determined center of symmetry, using the pixel coordinates of each symmetric signature pair that has contributed to the correct identification of the center of symmetry, a transformation rule can be determined for transforming pixel coordinates of the center of symmetry and/or of the at least one predefined even and/or odd point-symmetric region. The transformation rule can be applied to the pixel coordinates of the center of symmetry and/or of the at least one predefined even and/or odd point-symmetric region in order to rectify a distorted perspective of the camera image. Such an embodiment offers the advantage that a reliable and accurate reconstruction of the correct raster or the correct topology of a plurality of point-symmetric regions can be achieved.

Also, according to an example embodiment of the present invention, a symmetry type of the at least one center of symmetry can be determined in the step of determining. The symmetry type can represent an even point symmetry and, in addition or alternatively, an odd point symmetry. Additionally or alternatively, here in the step of performing a comparison can be carried out of the symmetry type of the at least one center of symmetry in the camera image with a predefined symmetry type of at least one reference center of symmetry in a reference image in order to check an agreement between the at least one center of symmetry and the at least one reference center of symmetry. Odd point symmetry can be produced by a point mirroring with inversion of gray values or color values. By using and identifying the two different point symmetries, an information content of point-symmetric regions and patterns can be increased.

Here, the image data read in in the step of reading in can represent a camera image of at least one pattern from a plurality of predefined even and/or odd point-symmetric regions. In the step of determining, a geometric configuration of centers of symmetry of the at least one pattern can be determined, a geometric sequence of symmetry types of the centers of symmetry can be determined, and additionally or alternatively, using the sequence, the pattern can be determined from a plurality of predefined patterns. The configuration and/or the sequence can represent an identification code of the pattern. Such a specific embodiment offers the advantage that a degree of certainty of the identification of centers of symmetry can be increased, and further information can be obtained by a recognition of a specific pattern. Also, reliable identification of centers of symmetry can be achieved for different distances between camera and pattern.

Here, in the step of determining, using the configuration of the centers of symmetry of the at least one pattern and, additionally or alternatively, the sequence of symmetry types of the centers of symmetry, an implicit item of additional information of the at least one pattern or a readout rule for reading out an explicit item of additional information in the camera image can be determined. The configuration and, additionally or alternatively, the sequence may or may not represent the additional item of information in coded form. The additional item of information can be related to the calibration of the camera. Such a specific embodiment offers the advantage that additional information can be communicated through the topology of the at least one pattern.

Also, in this regard, according to an example embodiment of the present invention, in the step of performing, as a function of the particular configuration, the particular sequence, and additionally or alternatively the particular pattern, the reference image can be selected from a plurality of stored reference images or can be generated using a stored generation rule. In this way, the correct reference image can be reliably identified. Optionally, given a link between identified patterns and a generation rule, a storage requirement for reference images can also be minimized, because only generation rules need to be stored.

In addition, the step of determining and additionally or alternatively the step of performing may be carried out together for all centers of symmetry independently of the symmetry type of the centers of symmetry, or may be carried out separately for the centers of symmetry of the same symmetry type as a function of the symmetry type of the centers of symmetry. In this way, a common carrying out can achieve low memory and time requirements for an accurate and reliable identification of the centers of symmetry. Optionally, in particular confusion with patterns occurring randomly in images can be minimized by separate carrying out.

According to the present invention, a method for calibrating a camera is also provided. According to an example embodiment of the present invention, the method has the following steps:

Evaluating calibration data provided in accordance with a specific embodiment of the method named above in order to generate a control signal as a function of the calibration data; and Outputting the control signal to an interface to the camera or to a calibration device of the camera in order to calibrate the camera.

This method can be implemented for example in software or hardware, or in a mixed form of software and hardware, for example in a control unit or device. The method for calibrating can here advantageously be carried out in connection with a specific embodiment of the method named above for provision.

In addition, according to an example embodiment of the present invention, a method is provided for producing at least one predefined even and/or odd point-symmetric region for use by an embodiment of a method named above, the method having the following steps:

Generating design data that represent a graphical representation of the at least one predefined even and/or odd point-symmetric region; and Generating the at least one predefined even and/or odd point-symmetric region using the design data on, at, or in a display medium to produce the at least one predefined even and/or odd point-symmetric region.

This method can be implemented for example in software or hardware, or in a mixed form of software and hardware, for example in a control unit or device. By carrying out the method for producing, at least one predefined even and/or odd point-symmetric region can be produced that can be used in a specific embodiment of a method named above.

According to a specific embodiment of the present invention, in the generation step design data can be generated that represent a graphical representation of the at least one predefined even and/or odd point-symmetric region as a circle, ellipse, square, rectangle, pentagon, hexagon, polygon, or circular ring. Here the at least one predefined even and/or odd point-symmetric region can have a regular or quasi-random content pattern. Additionally or alternatively, a first half of a surface of the at least one predefined even and/or odd point-symmetric region can be arbitrarily specified and a second half of the surface can be constructed by point mirroring and optionally additionally by inverting gray values and additionally or alternatively color values. Additionally or alternatively, in the step of generating, the at least one predefined even and/or odd point-symmetric region can be generated by an additive manufacturing process, cutting, coating, forming, master forming, or optical display. Additionally or alternatively, the display medium may include glass, stone, ceramic, plastic, rubber, metal, concrete, plaster, paper, cardboard, food, or an optical display device. In this way, the at least one predefined even and/or odd point-symmetric region can be produced in a precisely suitable manner, depending on the specific use or application and the boundary conditions prevailing there.

Also, design data representing a graphical representation of at least one pattern of a plurality of predefined even and/or odd point-symmetric regions can be generated in the step of generation. Here, at least a subset of the even and/or odd point-symmetric regions can be aligned on a regular or irregular grid, can be directly adjacent to each other, and can additionally or alternatively be partially separated from at least one adjacent even and/or odd point-symmetric region by an intermediate space, can be identical to or different from each other with respect to their dimensions and/or their content patterns, and can additionally or alternatively be situated in a common plane or in different planes. Additionally or alternatively, design data representing a graphical representation of at least one pattern with hierarchical symmetry may be generated in the generating step. In this way, different patterns with specific information content and, additionally or alternatively, patterns with hierarchical symmetries for different distances from the pattern can be produced.

Humans in particular find it difficult to perceive the symmetries hidden in the patterns, even if it is known that a corresponding marking is present. This also makes it possible, for example, to hide such markings. This can be useful or desired for various reasons, e.g., in particular for aesthetic reasons, because it is intended or desired for the technical markings not to be seen, e.g., because concentration should not be impaired by markings that are not important for people, or because the markings are to remain secret. Aesthetic factors play an important role, especially in the area of design. For example, in a vehicle interior, on the outer skin of a vehicle, on aesthetically designed objects, or in the field of interior or building architecture, conspicuous technical markers would not be accepted, or would be accepted only to a very small extent. However, if they were hidden, e.g., in a fabric pattern or in a plastic or ceramic relief or in a hologram or on a printed surface, as is possible according to some embodiments, they could be both beautiful and useful, e.g., in order to provide a camera with one or more reference points, e.g. in order to make it possible in this way to ascertain a relative camera pose. The aspect of hiding may also be irrelevant or of little relevance, depending on the application. Technical robustness then nonetheless still speaks in favor of the use of such designed patterns. In particular, a pattern with a random or pseudo-random character can provide many possibilities for finding symmetric point pairs that are as unambiguous as possible. According to some embodiments of the present invention, this can be exploited, for example, in particular with advantages for the signal-to-noise ratio of a measured response at the centers of symmetry and thus for robustness in the sense of their error-free detection and precise localization. In particular, a pattern may include one or more point-symmetric regions with odd or even point symmetry. For example, these regions can be circular, hexagonal, square, elliptical, polygonal, or can have other shapes. The point-symmetric regions can be the same or different in shape and size. They may abut one another without gaps or may be spaced apart from each other.

The approach presented herein further provides a device designed to perform, control, or implement the steps of a variant of a method presented herein in corresponding devices. This variant embodiment of the present invention in the form of a device can also solve the underlying task of the present invention quickly and efficiently.

For this purpose, the device can have at least one computing unit for processing signals or data, at least one memory unit for storing signals or data, at least one interface to a sensor or to an actuator for reading in sensor signals from the sensor or for outputting data or control signals to the actuator, and/or at least one communication interface for reading in or outputting data that are embedded in a communication protocol. For example, the computing unit may be a signal processor, a microcontroller, or the like, and the memory unit may be a flash memory, an EEPROM, or a magnetic memory unit. The communication interface can be designed to read in or output data wirelessly and/or in wire-bound fashion; a communication interface that can read in or output wire-bound data can for example read these data electrically or optically from a corresponding data transmission line, or can output these data to a corresponding data transmission line.

In the present context, a device can be understood as an electrical apparatus that processes sensor signals and outputs control and/or data signals as a function thereof. The device can have an interface, which may be realized as hardware and/or software. In a hardware realization, the interfaces can for example be part of a so-called system ASIC that contains a wide variety of functions of the device. However, it is also possible for the interfaces to be separate integrated circuits or to be made up at least in part of discrete components. In a software realization, the interfaces can be software modules that are for example present on a microcontroller alongside other software modules.

Also advantageous is a computer program product or computer program having program code that can be stored on a machine-readable carrier or storage medium, such as a semiconductor memory, a hard disk memory or an optical memory, and that is used to perform, implement and/or control the steps of the method according to one of the embodiments described above, in particular when the program product or program is executed on a computer or a device. In this context, the process can be implemented as a hardware accelerator on a SoC or ASIC.

Exemplary embodiments of the present invention are shown in the figures and are explained in more detail in the following description.

In the following description of advantageous embodiments of the present invention, the same or similar reference signs are used for the elements shown in the various figures and having a similar function, and a repeated description of these elements is omitted.

DETAILED DESCRIPTION OF EXAMPLE EMBODIMENTS

Figure 1:
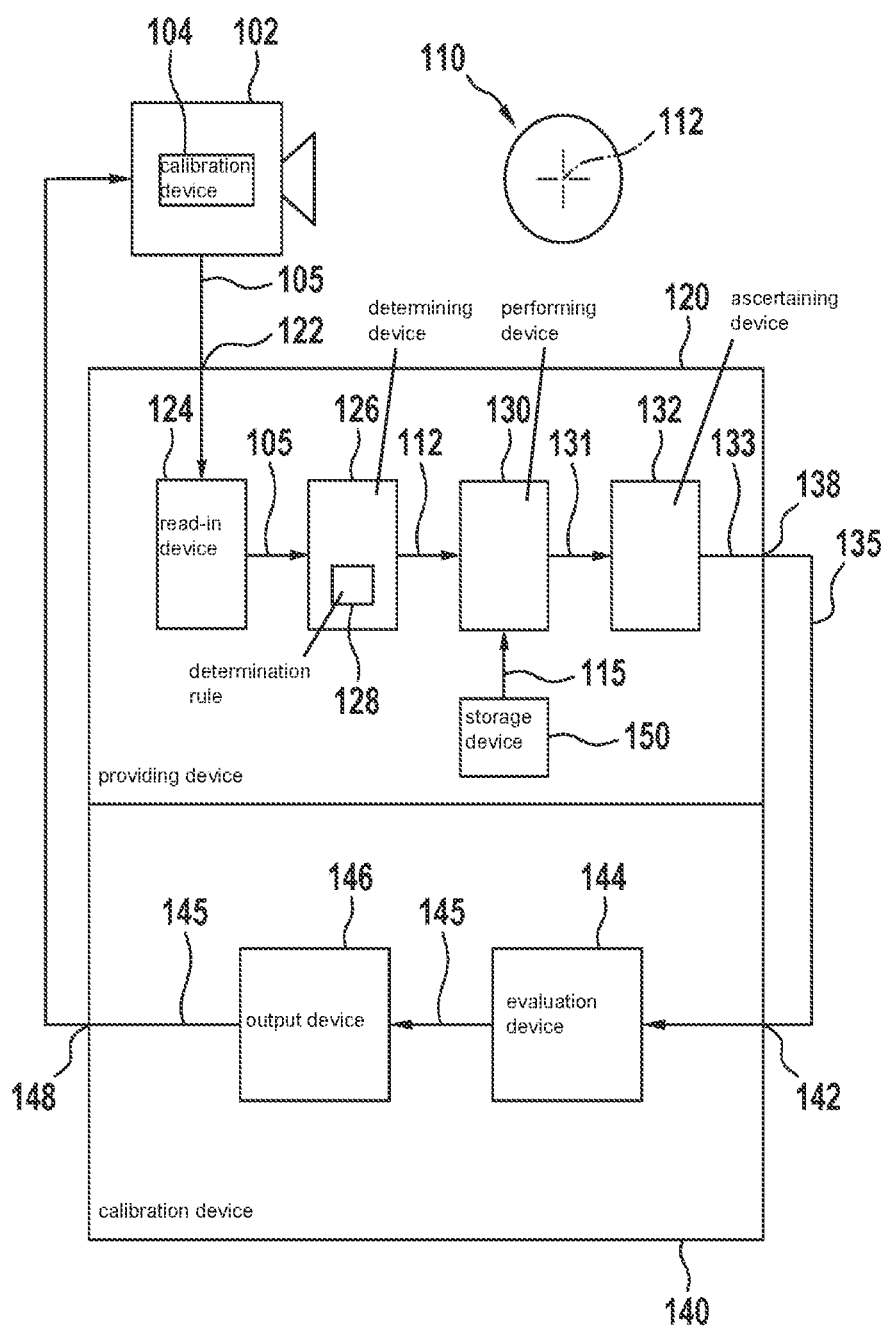
FIG. 1 is a schematic representation of an exemplary embodiment of a device for providing, an embodiment of a device for calibration, and a camera, according to the present invention.

FIG. 1 shows a schematic representation of an exemplary embodiment of a device 120 for providing, an exemplary embodiment of a device 140 for calibration, and a camera 102. In the embodiment of FIG. 1, device 120 for providing, i.e. providing device 120, and device 140 for calibrating, i.e. calibrating device 140, are shown separately, or situated outside of camera 102. Providing device 120 and calibration device 140 are connected to camera 102 so as to be capable of transmitting data. According to another embodiment, providing device 120 and/or calibration device 140 can also be part of camera 102 and/or combined with one another.

Camera 102 is designed to record a camera image of an environment surrounding camera 102. As an example, only a predefined even and/or odd point-symmetric region 110 having a center of symmetry 112 is situated in the environment of camera 102. Camera 102 is also designed to provide or generate image data 105 that represent the camera image, the camera image also showing the predefined even and/or odd point-symmetric region 110.

Providing device 120 is designed to provide calibration data 135 for calibrating camera 102. For this purpose, providing device 120 includes a read-in device 124, a determining device 126, a performing device 130, and an ascertaining device 132. Read-in device 124 is designed to read in image data 105 from an input interface 122 of providing device 120 to camera 102. In addition, read-in device 124 is also designed to forward the image data 105 representing the camera image to determining device 126.

Determining device 126 of providing device 120 is designed to determine the center of symmetry 112 of the at least one point-symmetric region 110 using image data 105 and a determination rule 128. Determination rule 128 is discussed in more detail below. Here it is to be noted that determination rule 128 is similar to or corresponds to a procedure disclosed in applicant's later-published DE 10 2020 202 160. Determining device 126 is also designed to forward the at least one determined center of symmetry 112 to performing device 130.

Performing device 130 is designed to perform a comparison of a position of the at least one center of symmetry 112 in the camera image with a predefined position of at least one reference center of symmetry in a reference image 115 relative to a reference coordinate system to determine a positional deviation 131 between center of symmetry 112 and the reference center of symmetry. Performing device 130 is also designed to read or receive reference image 115, or reference data 115, from a storage device 150. Storage device 150 may be realized as a part of providing device 120 or separately therefrom. In addition, performing device 130 is designed to forward the positional deviation 131 to ascertaining device 132.

Ascertaining device 132 is designed to then ascertain, using the positional deviation 131, displacement information 133 for at least a subset of pixels of the camera image relative to corresponding pixels of reference image 115. Providing device 120 is designed to provide the calibration data 135 using the displacement information 133. More precisely, providing device 120 is designed to provide calibration data 135 to calibration device 140 via an output interface 138 of providing device 120.

Calibration device 140 is designed to calibrate camera 102 or to control a calibration thereof. For this purpose, calibration device 140 includes an evaluation device 144 and an output device 146. Calibration device 140 is designed to receive or read in the calibration data 135 from providing device 120 via an input interface 142 of calibration device 140. Evaluation device 144 is designed to evaluate the calibration data 135 provided by providing device 120 in order to generate a control signal 145 that is a function of calibration data 135. Evaluation device 144 is also designed to forward control signal 145 to output device 146. Output device 146 is designed to output control signal 145 to an output interface 148 to the camera 102 and/or to a calibration device 104 of the camera 102, in order to calibrate camera 102 or to control a calibration thereof.

In particular, determination rule 128 is designed to cause a signature to be generated for a plurality of pixels of at least a portion of the camera image, in order to obtain a plurality of signatures. Here, each of the signatures is generated using a descriptor with a plurality of different filters. Each filter has at least one symmetry type. Each of the signatures includes a sign for each filter of the descriptor. Determination rule 128 is also designed to cause at least one reflector to be applied to the sign of one of the signatures in order to determine, for the signature, at least one mirror signature for at least one symmetry type of the filters. Here, each reflector for a symmetry type includes specific rules for the modification of the sign that are a function of the filters of the descriptor. The determination rule is further designed to bring it about that a pixel having the signature is checked for a presence of at least one further pixel having a signature corresponding to the at least one mirror signature in a search region that is a function of at least one of the applied reflectors in an environment around the pixel in order to ascertain, if at least one further pixel is present, pixel coordinates of at least one symmetric signature pair of the pixel and a further pixel. In addition, the determination rule is designed to bring it about that the pixel coordinates of the at least one symmetric signature pair are evaluated in order to identify the at least one center of symmetry.

According to an exemplary embodiment, determining device 126 is designed to determine a transformation rule for transforming pixel coordinates of center of symmetry 112 and/or point-symmetric region 110 for each already-determined center of symmetry 112, using the pixel coordinates of each symmetric signature pair that contributed to the correct identification of center of symmetry 112. The transformation rule is applied to the pixel coordinates of center of symmetry 112 and/or of point-symmetric region 110 in order to rectify a distorted perspective of the camera image. In addition, it is advantageous, because it is more robust, more accurate, and less noisy, to determine a transformation rule on the basis of multiple, in particular adjacent, point-symmetric regions 110, in particular if they are situated on a common plane. The application of the transformation is particularly advantageous when regarding a configuration of a plurality of centers of symmetry 112.

According to an exemplary embodiment, determining device 126 is also designed to determine a symmetry type of the at least one center of symmetry 112. The symmetry type represents an even point symmetry and, additionally or alternatively, an odd point symmetry. Additionally or alternatively, here performing device 130 is designed to perform a comparison of the symmetry type of the at least one center of symmetry 112 in the camera image with a predefined symmetry type of at least one reference center of symmetry in a reference image 115 in order to check for agreement between the at least one center of symmetry 112 and the at least one reference center of symmetry.

In particular, the image data 105 here represent a camera image of at least one pattern of a plurality of predefined point-symmetric regions 110. Here determining device 126 is designed to determine a geometric configuration of centers of symmetry 112 of the at least one pattern, to determine a geometric sequence of symmetry types of the centers of symmetry 112, and/or to determine the correct pattern represented by image data 105 from a plurality of predefined patterns, using the sequence. The configuration and/or the sequence can represent an identification code of the pattern. According to an exemplary embodiment, the determining device 126 is here designed to determine, using the configuration of the centers of symmetry 112 of the at least one pattern and/or the sequence of symmetry types of the centers of symmetry 112, an implicit additional item of information of the at least one pattern or a readout rule for reading out an explicit additional item of information in the camera image. The configuration and/or sequence represent or represents the additional information in coded form. The additional information relates to the calibration of camera 102. Additionally or alternatively, here performing device 130 is designed to select reference image 115 from a plurality of stored reference images or to generate it using a stored generation rule, as a function of the particular configuration, the particular sequence, and/or the particular pattern.

Figure 2:
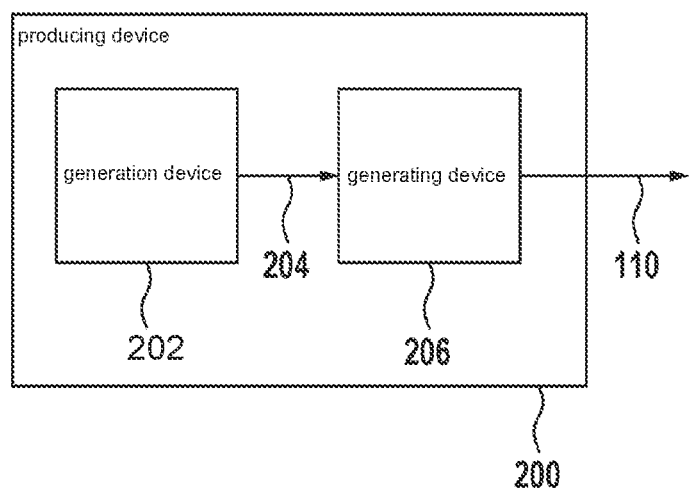
FIG. 2 is a schematic representation of an example embodiment of a device for producing, according to the present invention.

FIG. 2 shows a schematic diagram of an exemplary embodiment of a device 200 for producing. Producing device 200 is designed to produce at least one predefined even and/or odd point-symmetric region 110 for use by the providing device of FIG. 1 or a similar device and/or the calibration device of FIG. 1 or a similar device. For this purpose, device 200 for producing includes a generation device 202 and a generating device 206.

Generation device 202 is designed to generate design data 204. Design data 204 represent a graphical representation of the at least one predefined even and/or odd point-symmetric region 110. Generating device 206 is designed to, using design data 204, generate the at least one predefined even and/or odd point-symmetric region 110 on, at, or in a display medium, in order to produce the region.

According to an exemplary embodiment, generation device 202 is designed to generate design data 204 that represent a graphical representation of the at least one predefined point-symmetric region 110 as a circle, an ellipse, a square, a rectangle, a pentagon, a hexagon, a polygon, or a circular ring, the at least one predefined point-symmetric region 110 having a regular or quasi-random content pattern, and/or a first half of a surface of the at least one predefined point-symmetric region 110 being arbitrarily specified and a second half of the surface being constructed by point mirroring and/or inversion of gray values and/or color values. Additionally or alternatively, generating device 206 is designed to generate the at least one predefined point-symmetric region 110 by an additive manufacturing process, cutting, coating, forming, master forming, or optical display. Additionally or alternatively, the display medium here has glass, stone, ceramic, plastic, rubber, metal, concrete, plaster, paper, cardboard, food, or an optical display device.

According to an exemplary embodiment, generation device 202 is designed to generate design data 204 that represent a graphical representation of at least one pattern of a plurality of predefined point-symmetric regions 110, at least a subset of the point-symmetric regions 110 being aligned on a regular or irregular grid, being directly adjacent to each other, and/or being partially separated from at least one adjacent point-symmetric region 110 by a space, being identical to or different from each other with respect to their dimensions and/or their content patterns, and/or being situated in a common plane or in different planes. Additionally or alternatively, generation device 202 is designed to generate design data 204 representing a graphical representation of at least one pattern having hierarchical symmetry.

Figure 3:
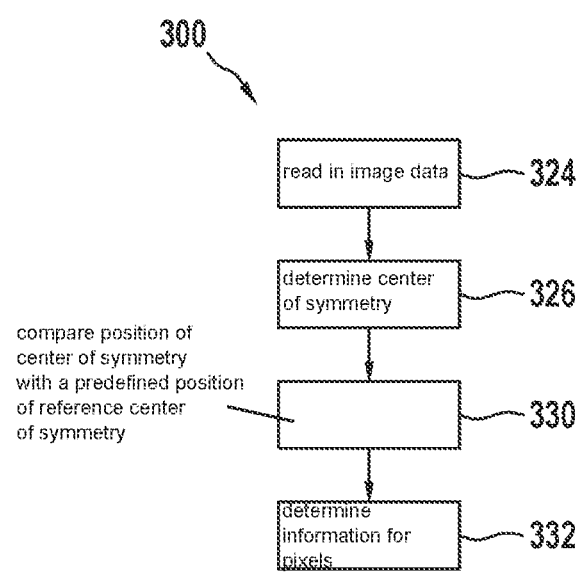
FIG. 3 is a flow diagram of an example embodiment of a method for providing, according to the present invention.

FIG. 3 shows a flow diagram of an exemplary embodiment of a method 300 for providing calibration data for calibrating a camera. Here the method 300 for providing can be carried out using the providing device of FIG. 1 or a similar device. Method 300 for providing includes a step 324 of reading in, a step 326 of determining, a step 330 of performing, and a step 332 of ascertaining.

In the step 324 of reading in, image data provided by the camera is read in from an interface to the camera. The image data represents a camera image of at least one predefined even and/or odd point-symmetric region in an environment of the camera. Subsequently, in step 326 of determining, using the image data and a determination rule, at least one center of symmetry of the at least one point-symmetric region is determined. Again subsequently, in the step 330 of performing, a comparison of a position of the at least one center of symmetry in the camera image with a predefined position of at least one reference center of symmetry in a reference image relative to a reference coordinate system is carried out in order to determine a positional deviation between the center of symmetry and the reference center of symmetry. Subsequently, in the step 332 of ascertaining, using the positional deviation displacement information is determined for at least a subset of pixels of the camera image relative to corresponding pixels of the reference image. Calibration data is provided using the ascertained displacement information.

According to an exemplary embodiment, the image data read in in the step 324 of reading in represent a camera image of at least one pattern of a plurality of predefined point-symmetric regions. In this regard, in the step 326 of determining, a geometrical configuration of centers of symmetry of the at least one pattern is determined, a geometrical sequence of symmetry types of the centers of symmetry is determined, and/or, using the sequence, the pattern is determined from a plurality of predefined patterns. The configuration and/or sequence represents or represents an identification code of the pattern. Optionally, the step 326 of determining and/or the step 330 of performing are carried out together for all centers of symmetry independently of the symmetry type of the centers of symmetry, or are executed separately for the centers of symmetry of the same symmetry type, as a function of the symmetry type of the centers of symmetry.

Figure 4:
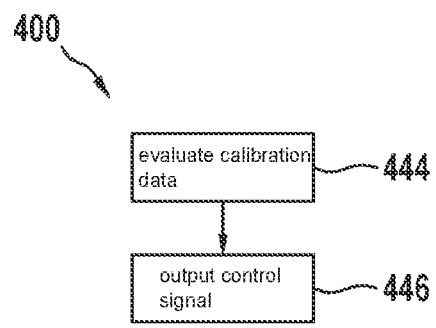
FIG. 4 is a flow diagram of an example embodiment of a method for calibration, according to the present invention.

FIG. 4 shows a flow diagram of an embodiment of a method 400 for calibrating a camera. The method 400 for calibration can here be carried out using the calibration device of FIG. 1 or a similar device. Also, the method 400 for calibrating can be carried out in conjunction with the method for providing of FIG. 3 or a similar method. Method 400 for calibrating includes a step 444 of evaluating and a step 446 of outputting.

In the step 444 of evaluating, calibration data provided in accordance with the method for providing of FIG. 3 or a similar method are evaluated to generate a control signal as a function of the calibration data. Subsequently, in the step 446 of outputting, the control signal is outputted to an interface to the camera or a calibration device of the camera in order to calibrate the camera.

Figure 5:
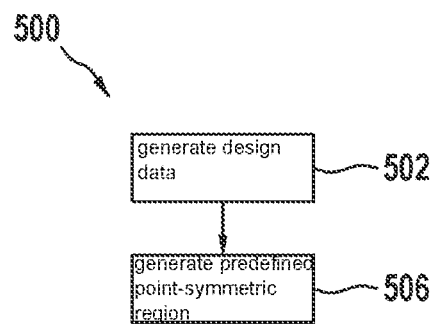
FIG. 5 is a flow diagram of an example embodiment of a method for producing, according to the present invention.

FIG. 5 shows a flow diagram of an embodiment of a method 500 for producing. Method 500 for producing can be carried out in order to produce at least one predefined point-symmetric region for use by the method for providing of FIG. 3 or a similar method and/or for use by the method for calibrating of FIG. 4 or a similar method. Also, the method 500 for producing is executable in conjunction with or using the device for producing of FIG. 2 or a similar device. Method 500 for producing includes a step 502 of generation and a step 506 of generating.

In the step 502 of generation, design data representing a graphical representation of the at least one predefined point-symmetric region are generated. Subsequently, in the step 506 of generating, using the design data the at least one predefined point-symmetric region is generated on, at, or in a display medium in order to produce the at least one predefined point-symmetric region.

Figure 6:
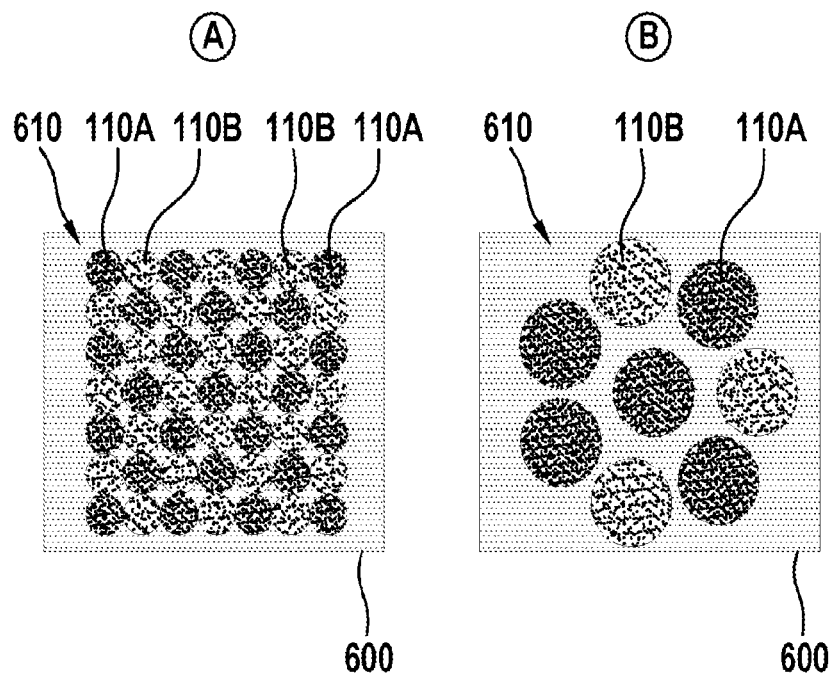
FIG. 6 shows schematic representations of display media with patterns of predefined point-symmetric regions according to embodiments of the present invention.

FIG. 6 shows schematic representations of display media 600 having patterns 610 of predefined point-symmetric regions 110A and 110B, according to exemplary embodiments. Each of the predefined point-symmetric regions 110A and 110B here corresponds to or resembles the predefined point-symmetric region of FIG. 1. In a first partial representation A, a pattern 610 is shown of, by way of example only, 49 predefined point-symmetric regions 110A and 110B, and in a second partial representation B a pattern 610 is shown of, by way of example only, eight predefined point-symmetric regions 110A and 110B.

Here, first predefined point-symmetric regions 110A have odd point symmetry as the symmetry type, and second predefined point-symmetric regions 110B have even point symmetry as the symmetry type. Here, a noise-like image pattern is printed on each of the display media 600 with the respective pattern 610.

FIG. 6 illustrates the use of symmetries in the field of machine vision according to exemplary embodiments, where the symmetries may be designed to be imperceptible or barely perceptible to humans, but at the same time are robust, locally precise, and detectable with minimal computational effort for exemplary embodiments. Here, in the patterns 610 point symmetries are quasi-hidden that are hardly recognizable for an observer. By graphically highlighting the predefined point-symmetric regions 110A and 110B in FIG. 6, these regions are recognizable for a human viewer in the noise-like image pattern on the display media 600. In the first partial representation A, 49 exemplary circular symmetrical regions 110A and 110B are included, of which, by way of example only, 25 are first regions 110A having odd point symmetry and 24 are second regions 110B having even point symmetry. In the second partial representation B, the symmetrical regions 110A and 110B, of which, by way of example only, five have an odd point symmetry and, by way of example only, three have an even point symmetry, are selected to be larger than in the first partial representation A, and are thus particularly suitable for larger camera distances or lower image resolutions. Thus, on the display media 600, which are realized as plates, there are circular symmetrical regions 110A and 110B, and in the case of odd or negative point symmetry, the point mirroring maps light to dark and vice versa, while in the case of even or positive point symmetry, this reversal does not occur. If a plurality of patterns 610 are required, they can be designed to be distinguishable. This can be done by the configuration of the centers of symmetry of regions 110A and 110B as shown in FIG. 6, in which the first partial representation A and the second partial representation B are easily distinguishable, or based on the sequence of negative or odd and positive or even point symmetries of regions 110A and 110B within the respective patterns 610.

Figure 7:
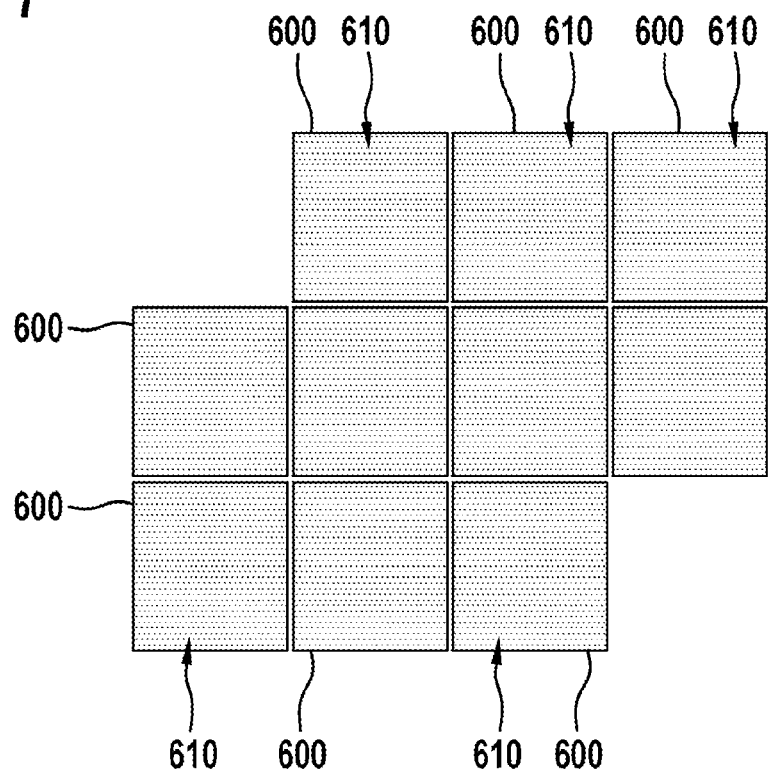
FIG. 7 shows schematic representations of display media with patterns of predefined point-symmetric regions according to embodiments of the present invention.

FIG. 7 shows schematic representations of display media 600 having patterns 610 of predefined point-symmetric regions, according to exemplary embodiments. Here, the patterns 610 correspond to or resemble one of the patterns of FIG. 6; the patterns 610 are shown without graphic highlighting in FIG. 7. In FIG. 7, by way of example only, ten display media 600 similar to those of FIG. 6 are shown.

Figure 8:
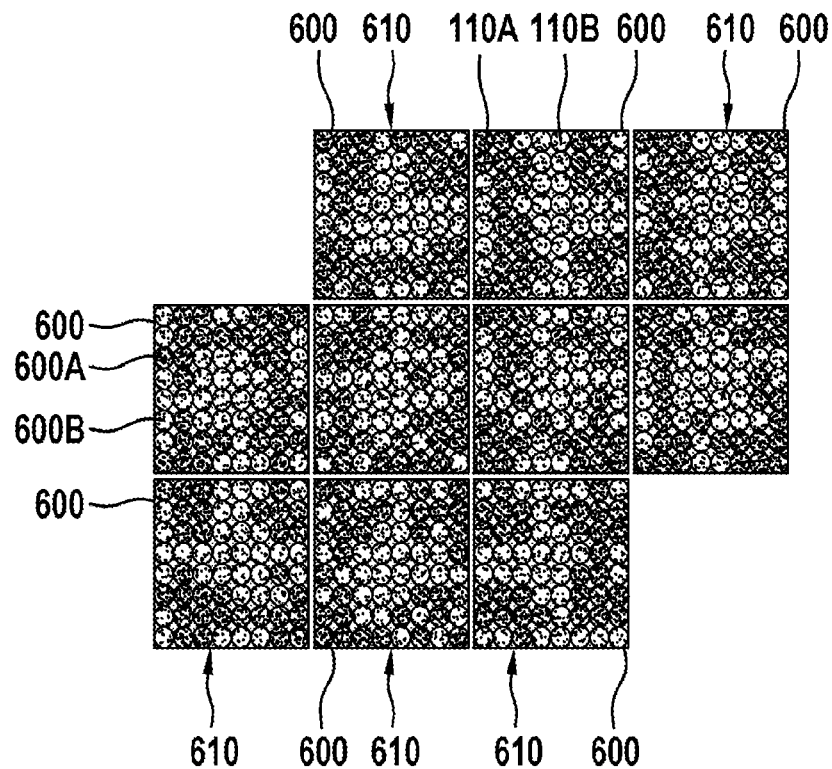
FIG. 8 shows schematic representations of the display media with the patterns from FIG. 7 with graphic highlighting of the patterns or of the predefined point-symmetric regions, according to an example embodiment of the present invention.

FIG. 8 shows schematic representations of the display media 600 with the patterns 610 of FIG. 7 with graphic highlighting of patterns or predefined point-symmetric regions 110A and 110B. Here, by way of example only, patterns 610 with predefined point-symmetric regions 110A and 110B are situated or graphically highlighted on the ten display media 600 in this case.

Thus, FIG. 7 and FIG. 8 show, by way of example only, ten patterns 610 optimized for distinguishability. Each pattern 610 has an individual configuration of the odd and even point-symmetric regions 110A and 110B. The patterns 610 are thus coded by this configuration. Here, the encodings were selected and matched to one another, and/or optimized by training, so that the ten patterns 610 are still clearly recognizable and distinguishable even when acquired by the camera in rotated or mirrored or partially obscured fashion. In the patterns 610 of FIG. 7 and FIG. 8, the point-symmetric regions 110A and 110B in each of the four corners of each display medium 600 are intentionally made slightly more prominent. This is irrelevant for the function per se, but provides practical advantages in manually assembling the display media 600 with patterns 610. The display media 600 with patterns 610 may be configured in any manner, such as three-dimensionally or flat in a row or as a surface, as part of the production process already described. The point centers of symmetry of the patterns 610 can be found correctly and accurately in the context of the providing method described earlier and/or using the providing device described earlier. For example, the patterns 610 may be printed on stable plates of any size, which may optionally be placed in a partially perpendicular configuration relative to each other. Even when there is blurred imaging of patterns 610 by the camera, the centers of symmetry can be detected sufficiently well to allow the described functions to be performed using them. Thus, the detection of point centers of symmetry is robust to unsharp imaging. This extends the range of use to situations in which work is done with a shallow depth of field, e.g. scenes with low light, or in which the focus or autofocus of the camera is incorrectly set or a perfectly sharp image cannot be achieved, e.g. in liquid or turbid or moving media or in the edge region of a lens or during relative movement between the pattern 610 and the camera (motion blur, directional blur). Even though point symmetries occur naturally, especially in human-designed environments, any false detections based on them have however a different spatial distribution than do detections based on correct patterns 610, and in this way the two groups can be easily separated or distinguished.

To convey that the above-named providing method works for non-planar and even elastic surfaces in motion, the patterns 610 of FIG. 7 and FIG. 8 can for example be printed on paper and assembled into a flexible box. Even with non-planar or elastic surfaces (such as those made of paper), the above-named providing method works without any problems. This allows the determination of movements of these surfaces. Paper, in contrast to many materials, does not allow shear, but point symmetry is also invariant to shear, so that this is not a difficulty.

In particular, a position of the centers of symmetry in the camera images can be precisely ascertained. However, it may also be of interest in various applications to extend this precise measurement to the entire area of the pattern 610. That is, for each point or pixel of pattern 610, to indicate where it is located in the camera image. This then allows, for example, the ascertaining of the smallest deviations between the really observed pattern 610 and the ideal pattern according to construction (ground truth). This is of interest, for example, when pattern 610 is printed on a non-smooth or non-rigid surface, resulting, for example, in variable folds or indentations in the pattern 610, whose exact shape is to be ascertained. In particular, patterns having a random character are excellently suited for finding corresponding points from a first image to a second image. The first and second images can be taken in temporal sequence with the same camera, or by two cameras from different perspectives.

In particular, consider the case in which the first image is a real image from a camera and the second image is an artificially generated (stored) image of the given pattern, also called a reference image, which has been placed (e.g. scaled, rotated, affine mapped, projected) into the second image, based e.g. on the found centers of symmetry, in such a way that it comes as close as possible to the real (first) image. In the case of the reference image, it may be possible to skip or save processing steps that are necessary for the first image that comes from the camera, e.g. image preprocessing steps. Then, conventional methods e.g. of optical flow or disparity estimation can subsequently be applied to find, e.g. for each pixel in the camera image, the correspondence in the reference image, or vice versa. This therefore results in a two-step procedure: In the first step, the found centers of symmetry, and possibly the contained coding, are used to register or roughly align the real image to the known pattern. This then represents the initialization, in order to again determine, in the second step, e.g. with methods of optical flow, the smallest deviations in the sense of local displacements between the registered real image and the pattern precisely, if necessary for each point or pixel of the image or the pattern 610. The smaller the search region, the smaller the computational effort to be applied for the second step. Here it is usually very small, due to the good initialization from the first step. Since both steps require little computational effort, a high pixel throughput is achieved on common computing platforms, defined as the product of refresh rate (images/s) and image size (pixels/image). If no match can be found in places, this is usually explained in that the view of the pattern 610 is obscured by an object. From this, conclusions can be drawn about a shape or an outline of the obscuring object.

For the above two-step procedure, the reference image is to be provided. This can be done by keeping the corresponding reference image in a memory for all patterns 610 in question.

The associated storage outlay can be reduced by storing only the respective parameters that are necessary to recalculate or generate the reference image as needed. For example, the patterns 610 can be generated according to simple rules using a quasi-random number generator. The word "quasi" here indicates that the random number generator actually works according to deterministic rules and its results are therefore reproducible, which is an advantage here. By "rules" here is meant, for example, the diameter of the symmetrical regions 110A and 110B and how the mirroring is to be performed, and how the pattern 610 is made up in weighted fashion of multiple patterns with different levels of detail, for example so that it is readily detectable at short, medium and long distances. It is then sufficient to store only the initialization data (seeds) of the quasi-random number generator and, if necessary, the selection of rules for the construction of pattern 610. Using this formation rule, the reference pattern can always be generated anew and identically (and subsequently deleted again) if required.

In summary, the two-step procedure can be represented as follows, for example. In the first step, the centers of symmetry are found and their signs are ascertained. By sign is meant here the case distinction between odd and even symmetry. By comparing the sequence of the signs, it is ascertained which of a plurality of patterns is present. The sequence of signs of pattern 610 can also be referred to as a code. This is compactly writable and requires at most 64 bits for a pattern 610 with, for example, 8×8 centers of symmetry. For the purpose of the comparison, all existing or possibly relevant codes should be stored. From this set, the code is sought that matches observation in as contradiction-free a manner as possible. This result is usually unambiguous. This search is still possible even if the camera can only acquire a part of pattern 610, e.g. due to occlusion, because the code in this example, with 8×8 centers of symmetry, offers a very large number of possibilities of up to $2^{64}$, while the number of produced patterns 610 will be much smaller, so there is a high degree of redundancy. For each stored code, the information such as parameters and selection of rules necessary to generate the reference image are also to be stored. This is generated for the second step, e.g. as needed, i.e. not until the time when it is needed, and if necessary only temporarily.

On the basis of the positions of the centers of symmetry in the coordinates of the camera image found in the first step and the known positions corresponding thereto in the reference image, a transformation rule can be calculated that maps these coordinates into each other as well as possible, for example with a projective or affine mapping that is optimized in the sense of least squares. With this transformation and suitable filtering of the image data, the two images can be transformed (warped) into a common coordinate system, e.g. the coordinate system of the camera image or the coordinate system of the reference image, or any third coordinate system. The two images, which are thus already aligned with one another, are then compared more closely, e.g. using optical flow methods. For example, for each pixel of the first image, preferably taking into account its environment, the best corresponding pixel, with environment, of the second image is sought. The relative displacement of the corresponding positions can be expressed as displacement information, in particular as absolute coordinates or as a displacement vector. The ascertaining of such a displacement vector can be done with sub-pixel accuracy; the correspondence then usually lies not on the pixel grid, but in between. This information allows highly accurate analysis over the entire surface of the pattern 610 captured in the camera image, e.g. in order to analyze, with elastic patterns, deformations or distortions of the pattern 610 or its support/display medium 600, or to analyze deviations of the image in the optical path in the case of rigid patterns.

If a sought correspondence cannot be found in the expected region, a local occlusion of pattern 610 can then be inferred. The cause of the occlusion may be, for example, an object lying on pattern 610, or a second pattern that partially occludes the first pattern. Valuable information can also be gained from this occlusion analysis, e.g. masks or outlines of the objects.

Figure 9:
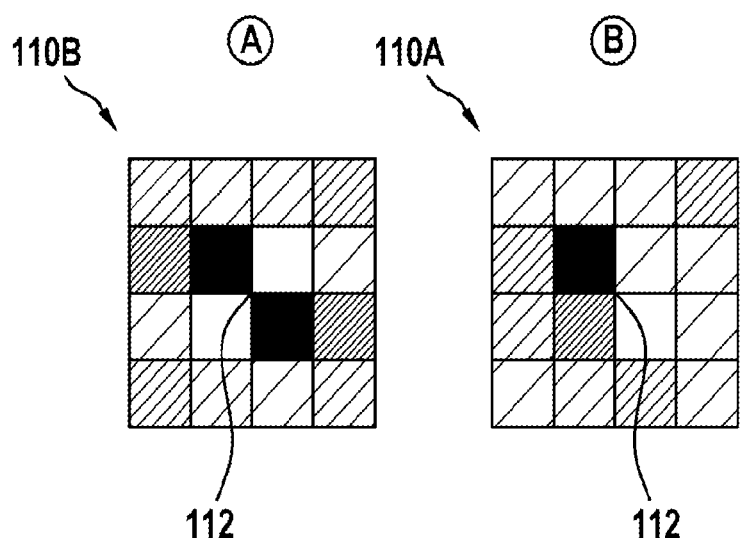
FIG. 9 shows schematic representations of predefined point-symmetric regions according to example embodiments of the present invention.

FIG. 9 shows schematic representations of predefined point-symmetric regions 110A and 110B, according to embodiments. Here each of the predefined point-symmetric regions 110A and 110B corresponds to or resembles the predefined point-symmetric region from one of the figures described above. In a first partial representation A, a second point-symmetric, or even point-symmetric, region 110B, including its center of symmetry 112, is shown, and in a second partial representation B a first point-symmetric, or odd point-symmetric, region 110A, including its center of symmetry 112, is shown. The predefined point-symmetric regions 110A and 110B here represent regions formed with gray levels.

Compared to other forms of symmetry, the use of point symmetry has the advantages that it is preserved when the pattern and/or the at least one predefined point-symmetric region is rotated about the visual axis, and that it is also preserved when the pattern and/or the at least one predefined point-symmetric region is tilted, i.e. under oblique perspectives. Rotation and tilting of the pattern/or of the at least one predefined point-symmetric region do not pose a problem for the detection of the odd and even point symmetries, because these remain preserved here. As a result, the above method for providing is also suitable for oblique perspectives on the pattern or on the at least one predefined point-symmetric region. With even point symmetry, for example, a gray or color value is preserved in the point mirroring.

For each gray value g, the same partner gray value $g_{PG}=g$ is found point-symmetrical to the center of symmetry 112 in the first partial representation A of FIG. 9. In the second partial representation B of FIG. 9, odd point symmetry is shown, and the gray value is inverted in each case: for example, white becomes black and vice versa, light gray becomes dark gray and vice versa. In this example with gray values g in the interval 0≤g≤1, the point-mirrored gray values $g_{PU}$ were formed in the simplest possible way according to $g_{PU}=1-g$ from the original gray values g from one half of region 110A, shown at top in the illustration of FIG. 9. Nonlinearities can also be integrated into the inversion, for example gamma corrections, e.g. to compensate for other nonlinearities in the image display and image capture. The formation of suitable odd or even point-symmetric patterns is correspondingly simple. For example, the half of the respective region 110A or 110B shown at top in the illustration of FIG. 9 is arbitrarily determined or randomly generated. The half shown at bottom in FIG. 9 then results from this, by point mirroring with inversion of the gray values for odd point symmetry or without inversion of the gray values for even point symmetry.

This observation or generation can also be extended to colored patterns and/or predefined point-symmetric regions. In the case of odd point symmetry, the point-mirrored RGB values can be formed here by inverting the individual original RGB values, which is again the simplest possibility; i.e. $r_{PU}=1-r$ (red), $g_{PU}=1-g$ (g stands for green here), $b_{PU}=1-b$ (blue). For example, dark purple is mapped to light green, and blue is mapped to orange. Colored patterns can represent more information than monochrome patterns, which can be advantageous. A precondition for making use of this advantage is that the color information is also utilized when converting the original image, i.e. color image from a camera or other imaging sensor, into descriptors.

In the following, also with reference to the figures described above, a specific embodiment of the patterns 610 and/or of the at least one predefined point-symmetric region 110 and/or 110A and/or 110B will be discussed.

With respect to a configuration of the patterns 610 and/or the at least one predefined point-symmetric region 110 and/or 110A and/or 110B, as shown for example in FIG. 6, the point-symmetric regions 110 and/or 110A and/or 110B may for example be circular, and may in turn be configured mostly in a regular grid in the pattern 610. For example, areas may be left unused between the circular regions 110 or 110A and/or 110B. There are alternatives: for example, the regions 110 or 110A and/or 110B may be square and adjoin one another without gaps, so that the entire surface is utilized, or the symmetrical regions 110 or 110A and/or 110B may be regular hexagonal areas that also adjoin one another without gaps so that the entire surface is utilized.

Figure 10:
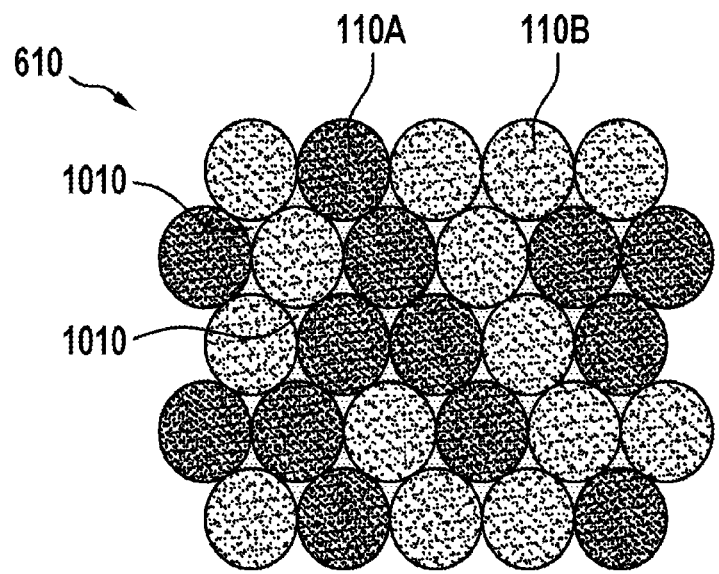
FIG. 10 shows a schematic representation of a pattern of predefined point-symmetric regions according to an example embodiment of the present invention.

In this context, FIG. 10 shows a schematic representation of a pattern 610 of predefined point-symmetric regions 110A and 110B according to an exemplary embodiment. Here the predefined point-symmetric regions 110A and 110B correspond to or are similar to the predefined point-symmetric regions of FIG. 1, FIG. 6, and/or FIG. 8. Regions 110A and 110B in FIG. 10 are each circular and are situated on a hexagonal grid. Here, a distance between grid points or centers of symmetry can correspond to the diameter of the circle. In this way, an unused area 1010 between regions 110A and 110B in pattern 610 can be minimized.

Other configurations and shapes are also possible, e.g. rectangles, polygons, etc., which can also be combined with each other in shape and/or size. For example, an alternation of pentagons and hexagons as on an ordinary soccer ball. The shapes can also be configured differently, e.g. rotated, possibly with asymmetrical regions between them. It is also possible for the center of symmetry to lie outside the point-symmetric region itself. This is the case, for example, when a circular ring is the shape. It is also not necessary for all point-symmetric regions to lie in a common plane. Instead, they can lie on different surfaces in the space, which surfaces may also be uneven.

The patterns 610 and/or the at least one predefined point-symmetric region 110 and/or 110A and/or 110B may be formed in a wide variety of ways. Only a few examples are given below. Random patterns or quasi-random patterns such as noise patterns. These were formed by including low spatial frequency components in such a way that they are still perceived by the camera as sufficiently high-contrast noise patterns even at medium and longer distances. So-called white noise, i.e. uncorrelated gray values, would be unsuitable for this purpose. Aesthetic, possibly regular patterns, such as floral patterns, tendril patterns (leaves, branches, flowers), ornamental patterns, mosaics, mathematical patterns, traditional patterns, onion patterns, patterns of iconic symbols (hearts, etc.). Mimicry of random patterns from nature, such as farmland, forest floor, lawn, gravel beach, sand, bulk material (crushed stone, salt, rice, seeds), marble, quarry stone, concrete, brick, slate, asphalt surface, starry sky, water surface, felt, hammered varnish, rusty iron sheet, sheepskin, scattered particles, etc. Photos of scenes with any content. In order to create a point-symmetric region and/or pattern suitable for the purposes mentioned herein from such a pattern, one half of the respective surface is specified arbitrarily and the second half is constructed by point mirroring and, if necessary, inversion of the gray values or color values. See also FIG. 9 for a simple example of this.

With respect to the material, surface, and production of pattern 610 and/or the at least one predefined point-symmetric region 110 or 110A and/or 110B, there are numerous possibilities. The following list makes no claim to completeness: Black and white, grayscale or multicolor printing on a wide variety of materials, printing on or behind glass or transparent film, printing on or behind matte glass or semi-transparent film, relief in stone or glass or plastic or rubber, relief in fired materials such as earthenware, terracotta or ceramics, relief casting in metal or concrete or plaster, embossing in plastic or paper/cardboard, etching in glass or metal or ceramic surface, milling in wood, cardboard, metal, stone, etc., burnt surface in wood or paper, photographic exposure of paper or other materials, transient or decaying or water-soluble patterns for short-term applications in plant material, ash, sand, wood, paper, on fruits, eggshells, peels of other foodstuffs, etc., representation as a hologram, representation on a monitor or display, if necessary also time-variable, representation on an LCD film or other display film, if necessary also time-variable, etc.

With regard to relief-type manufacturing options, as in the case of milling, embossing, stamping, etc., it is to be noted that the region should be perceived by the camera as odd and/or evenly symmetrical. Therefore, it may be necessary already during the design phase to take into account later illumination, such as oblique light incidence on a relief, and nonlinearities in the optical imaging and other disturbances. It is not crucial for the 3D shape or relief itself to have the even and/or odd point symmetry type, but rather for the image captured by the camera to show this symmetry. Incidence of light or direction of illumination and reflection of light on the surface are also relevant and should be considered in the design.

With regard to image capture and illumination, it should be noted that for an acquisition of the pattern 610 and/or the at least one predefined point-symmetric region 110 or 110A and/or 110B, the acquisition technique should be suitably designed. In particular, when there are rapid relative movements between pattern 610 and/or region(s) 110 or 110A and/or 110B and the camera, it is advisable to use suitable lighting (e.g. flash or strobe lighting or bright LED light) so that the exposure time and thus the motion blur in the image can be kept small. For various applications, it is expedient to apply pattern 610 and/or region(s) 110 or 110A and/or 110B onto a transparent or semitransparent surface. This allows pattern 610 and/or region(s) 110 or 110A and/or 110B to be illuminated from one side and observed from the other. This solution effectively avoids disturbing reflections of the light source on the display medium. For the configuration of pattern 610 and/or region(s) 110 or 110A and/or 110B, light source, and camera, there is in each case the freedom to choose the front or the back of the carrier or display medium. The choice may also be influenced by the risk of soiling of pattern 610 and/or region(s) 110 or 110A and/or 110B, or the camera, or wear of pattern 610 and/or region(s) 110 or 110A and/or 110B: For example, it may be expedient to attach pattern 610 and/or region(s) 110 or 110A and/or 110B and the camera on the rear side because they can be better protected there e.g. from dust or water, or because pattern 610 and/or region(s) 110 or 110A and/or 110B is/are protected there from mechanical wear.

In the subsequently published DE 10 2020 202 160, a method is disclosed that is also used in exemplary embodiments to find symmetrical regions or patterns in an image reliably and with very little computational effort. Here, the original image, i.e., a color image or grayscale image from a camera or other imaging sensor, is converted into an image of descriptors, each descriptor being formed based on a local environment of the original image. Here, the descriptor is another form of representation for the local image content, which prepares it in a form that is easier to process. Here, "easier" is to be understood as meaning, inter alia: contains information about the surroundings of the point and not only about the point itself, extensive invariance to brightness or illumination and changes thereof, and lower sensitivity to noise of the sensor. The descriptor image can have the same resolution as the original image, so that, approximately, there is one descriptor for each pixel of the original image. Other resolutions are also possible, alternatively or additionally.

From the respective descriptor, which is represented in a computer unit as a binary word, or from several neighboring descriptors in each case, a signature is formed that describes the local environment of the pixel of the original image as characteristically as possible. The signature can also be identical with the descriptor or a part of it. The signature is used as an address for accessing a lookup table. Accordingly, if the signature is made up of N bits, a lookup table of size $2^N$ (that is: 2 to the power of N) can be accessed. It is advantageous not to choose the word length N of the signature to be too large, because the memory requirement for the table grows exponentially with N: for example, $8 \leq N \leq 32$. The signature or descriptor is constructed in such a way that signature symmetries can be ascertained with simple operations, e.g. bitwise XOR (exclusive OR) on a part of the bits. Example: $s_P = s \;\hat{}\; R_P$, where s is a signature of length N bits and $R_P$ is a reflector (R) matched thereto for point symmetry (P). The character ˆ stands for the bitwise XOR operation. The signature $s_P$ thus stands for the point-symmetric counterpart of the signature s. This relationship also holds in the opposite direction.

If the construction of the descriptor or of the signature is fixed, the reflector is then automatically defined (and constant). By applying it to any signature, it can be transformed into its symmetric counterpart. There exists an algorithm that finds, for the given signature at the current pixel, one or more symmetric signature pixels within an optionally restricted search window. The center of symmetry is then located at the center on the connecting line between the positions of these two pixels. There, or as close as possible, a voting weight is issued and collected in a voting matrix (or voting map). In the voting matrix, the cast voting weights cluster at locations of the sought centers of symmetry. These can thus be found e.g. by searching the voting matrix for clustering points. This works for point symmetry, horizontal axis symmetry, vertical axis symmetry, as well as other symmetries if required, e.g. mirror symmetry on other axes, as well as rotational symmetry. An even more precise localization with sub-pixel accuracy is possible if, in the evaluation of the voting matrix to ascertain the clustering points and precise localization of the centers of symmetry, the local environment is also included in the consideration in each case.

Figure 15:
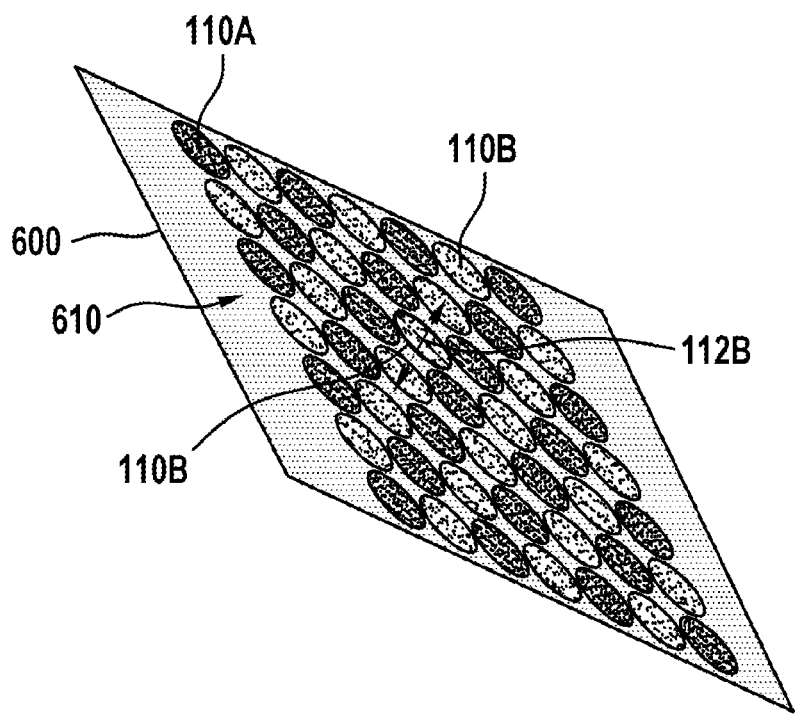
FIG. 15 shows the pattern from the first partial representation of FIG. 14, highlighting a predefined point-symmetric region.

FIG. 15 of DE 10 2020 202 160 illustrates an algorithm that can find point-symmetric correspondences to the signature currently under consideration. However, only even point symmetries are considered there.

According to exemplary embodiments, this algorithm is extended to odd point symmetries. It is particularly advantageous that the odd and even symmetries can be ascertained simultaneously in only one common pass. This saves time, because only one pass through the signature image is required instead of two passes, and latency. If only one pass (instead of two) is required, processing in stream mode can provide the result of the symmetry search with much lower latency. In that case, processing is already started as soon as the first pixel data arrive from the camera, and the processing steps are executed in close succession. This means that the signature is already calculated as soon as the necessary image data from the local environment of the current pixel are available. The search for symmetries is immediately performed for the signature just formed. As soon as parts of the voting matrix are ready, which is the case when they are no longer part of the search region and will not become so, they can be evaluated immediately and any symmetries found (strong centers of symmetry) can be outputted immediately. This procedure results in very low latencies, typically corresponding to only a few image lines, as a function of the height of the search region. Low latencies are important when fast reaction is required, e.g. within a control loop in which an actuator influences the relative pose between the symmetry object and the camera. Memory can also be saved. The voting matrix (voting map) can be used in common for both symmetry forms, i.e. even point symmetry and odd point symmetry, the two symmetry forms or symmetry types participating in the voting with different signs, e.g. subtraction of the voting weight in the case of odd point symmetry and addition of the voting weight in the case of even point symmetry. This is explained in more detail below. In addition, saved memory can also save energy. The low-latency possible realization described above also has the result that only a small amount of intermediate data needs to be stored, as opposed to entire images. This working with little memory is especially important for cost-critical embedded systems, and also leads to savings in energy requirements.

Figure 11:
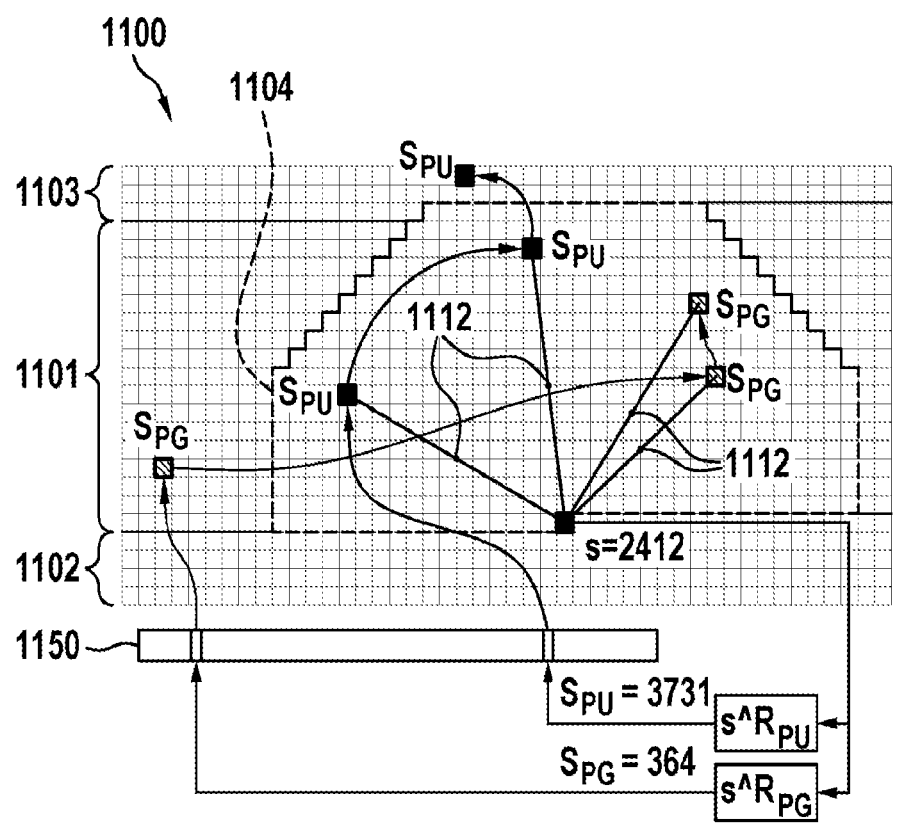
FIG. 11 shows a schematic representation for the use of a look-up table according to an example embodiment of the present invention.

FIG. 11 shows a schematic diagram for using a look-up table 1150 according to an embodiment. The look-up table 1150 is usable by the determining device of the device for providing of FIG. 1 or a similar device. In other words, an exemplary embodiment of an algorithmic procedure in a search for point-symmetric correspondences is shown in FIG. 11 as a momentary capture in connection with the device for providing of FIG. 1 or a similar device and/or the method for providing of FIG. 3 or a similar method. In particular, the representation in FIG. 11 is also similar to FIG. 15 of post-published DE 10 2020 202 160; here, FIG. 11 additionally includes an expansion to even and odd point symmetry.

Lookup table 1150 can also be referred to here as an entry table. Shown is a pixel grid 1100 in which a signature s having an exemplary value of 2412 has been generated for a pixel currently being regarded or processed. In other words, FIG. 11 shows a snapshot during a formation of a chaining of pixels or pixel coordinates having identical signature s. For clarity, two of up to N possible chains are shown, for signature $s_{PG}$=364 and for signature $s_{PU}$=3731. In pixel grid 1100, one reference to the position of the last predecessor signature that had the same signature value can be stored per pixel. In this way a chaining of the positions with identical signature results in each case. Thus, the signature values themselves do not need to be stored. In the lookup table 1150 or entry table with N table fields, a corresponding entry position is stored in pixel grid 1100 for each signature value. Here N corresponds to a number of possible signature values. The stored value can also be "invalid." The contents of lookup table 1150 or entry table and the image of references (chaining image) change dynamically.

An e.g. line-by-line processing pixel by pixel in pixel grid 1100 began e.g. at the upper left in FIG. 11, as illustrated by an arrow, and has currently progressed to a pixel having the signature s=2412. Chainings between pixel positions each having an identical signature are stored only for a first image region 1101. For a second image region 1102 in the lower image portion, the chainings and signatures are not yet known at the time shown, and for a third image region 1103 in the upper image portion the chainings are no longer required, e.g. due to a limitation of a search region, it being possible to release a chain memory for pixels in the third image region 1103 again.

For the signature s just formed, the even point-mirrored signature $s_{PG}$=364 is formed by applying a reflector $R_{PG}$. The index PG stands for point symmetry, even. In the following, the index PU is also used, which stands for point symmetry, odd. This value is used as an address into lookup table 1150 to find the entry to that chaining of pixel positions to which the same signature value $s_{PG}$=364 is assigned. Lookup table 1150 includes two elements at the time shown: the entry pixel positions for the respective signature s along with the references to them, illustrated by curved arrows. Other possibly existing contents of lookup table 1150 are not shown for reasons of clarity. The chaining for the signature value $s_{PG}$=364 here comprises, by way of example only, three represented pixel positions. Two of these are located in a search region 1104, which can also have a shape other than that shown here, e.g. rectangular or circular. In the case of unidirectional traversal along the chain, starting from the bottom, here two point-symmetric correspondence candidates are found that lie within search region 1104. The third correspondence, which is the first element of the chain for even point symmetry, is not of interest here because it is outside search region 1104 and is thus located too far from the current pixel position. If the number of center of symmetry candidates 1112 is not too large, one voting weight can be cast per center of symmetry candidate 1112 for the location of the respective symmetry center. The center of symmetry candidate 1112 lies in each case in the center on the connecting axis between the position of the signature s and the respective even point-mirrored signature $s_{PG}$. If there is more than one candidate center of symmetry 1112, the voting weight can be reduced in each case; for example, the reciprocal of the number of candidate centers of symmetry can be used as the respective voting weight. As a result, ambiguous center of symmetry candidates are weighted lower than unambiguous center of symmetry candidates.

A consideration and use of an odd point mirrored signature is now carried out. In the snapshot shown in FIG. 11, the odd point-mirrored signature $s_{PU}$=3731 is formed for the signature s just formed, by applying another reflector Rev. Analogous to the procedure described above for the even point-mirrored signature, the same steps are carried out for the odd point-mirrored signature. The entry to the corresponding chain is found via the same lookup table 1150. Here, lookup table 1150 refers to the chaining shown for odd point symmetry for signature 3731. The first two pixel positions along the chain again result in the formation of center of symmetry candidates 1112 because they are located in the search region 1104 and because the number of center of symmetry candidates 1112 is not too large. The last pixel position along the chain is in the third image region 1103. This region is no longer needed at all, since it can no longer come into the search region 1104 that is sliding line by line here.

If the next reference within a chain refers to the third image region 1103, the traversal along the chain can be aborted. Of course, the traversal is also terminated when the end of the chain is reached. In both cases, it makes sense to limit the number of center of symmetry candidates 1112; i.e. if there are too many competing center of symmetry candidates 1112, to discard them all. Furthermore, it is expedient to terminate the traversal along a chain prematurely if neither its end nor the third image region 1103 could be reached after a predetermined maximum number of steps along the chain. Also in this case, all center of symmetry candidates 1112 found up to this point should be discarded.

Memory for the chain in the third image region 1103 can already be released again, so that chain memory only needs to be kept available for the size of the first image region 1101. The chain memory requirement is thus low overall, and here is essentially a function of only one dimension of the search region 1104, here the search region height, and of one dimension of the signature image, here the signature image width.

It may be that a candidate center of symmetry 1112 does not always fall exactly on one pixel position; rather, there are three other possibilities. Overall, there are thus four possibilities:

1. Point or center of symmetry candidate 1112 falls on a pixel position.
2. Point or center of symmetry candidate 1112 falls centrally between two horizontally directly adjacent pixel positions.
3. Point or center of symmetry candidate 1112 falls centrally between two vertically directly adjacent pixel positions.
4. Point or center of symmetry candidate 1112 falls centrally between four directly adjacent pixel positions.

In the ambiguous cases 2. to 4. it is advantageous to distribute the voting weight to be cast uniformly among the pixel positions involved. The cast voting weights are entered in a voting matrix and are added up or accumulated therein.

Not only positive but at the same time also negative voting weights are used here. In particular, the even symmetries are given a different sign, here positive, than the odd symmetries, here negative. This leads to unambiguous results: in image regions without symmetries, which in practice usually represent the majority, positive and negative voting weights cast roughly balance each other out and thus roughly cancel each other out in the voting matrix. Thus, on average, the voting matrix yields about a zero. In contrast, strong extrema in the voting matrix result in odd symmetric or even symmetric regions, namely, in this embodiment, negative-value minima for odd point symmetries and positive-value maxima for even point symmetries.

According to the exemplary embodiment shown here, the same resources are used for the odd and even point symmetries, i.e. lookup table 1150 or entry table, chain image, voting matrix, which in particular saves on required memory, and both symmetry forms or symmetry types are considered in a common pass, which saves time and buffer memory.

Figure 12:
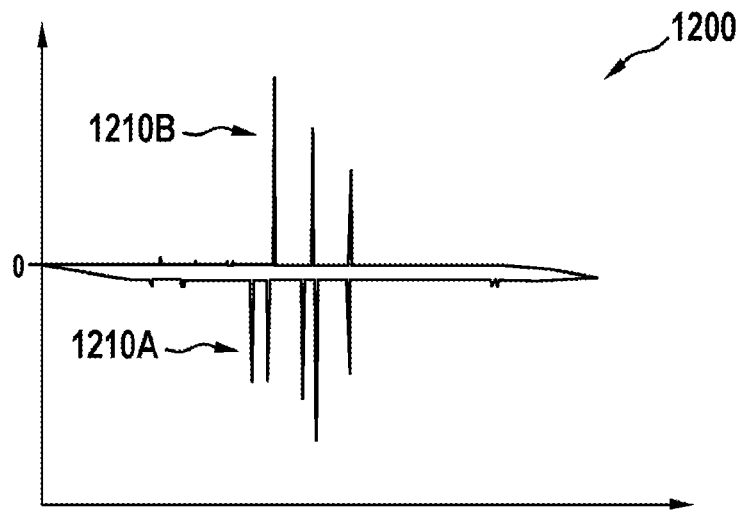
FIG. 12 shows a schematic diagram for a voting matrix according to an example embodiment of the present invention.

FIG. 12 shows a schematic diagram 1200 of a voting matrix according to an exemplary embodiment. The diagram 1200 relates to a voting matrix as a 3D plot for a camera image processed by the providing device of FIG. 1 or a similar device, in which the pattern from the second partial representation of FIG. 6 has been recorded by a camera.

Clearly seen in the voting matrix or diagram 1200 are, as examples, three maxima 1210B and five minima 1210A, standing for the three even point-symmetric and five odd point-symmetric regions of the pattern of the second partial embodiment of FIG. 6. Outside these extrema, the values in the voting matrix are close to zero. Thus, the extrema are very easy to determine, and the positions of the centers of symmetry in the camera image can thus be determined unambiguously and precisely.

FIG. 12 shows that these extrema are very pronounced and thus easily detectable without doubt by the device for providing of FIG. 1 or a similar device and/or the method or providing of FIG. 3 or a similar method. The information about the type of symmetry, i.e. odd or even, is here contained in the sign. A highly precise ascertaining of the position of the centers of symmetry with sub-pixel accuracy is possible if the local environment of the respective extremum is also included in the evaluation of the voting matrix. Appropriate methods for this purpose are conventional to those skilled in the art. If the patterns are constructed suitably, odd and even point symmetries do not compete with each other. Then an image region has, if at all, either the odd or the even point symmetry shape. Even if odd and even point-symmetric regions are close to each other in the camera image, it is possible to ensure that their centers of symmetry still remain spatially separated or distinguishable from each other. There are then advantages in terms of resources and speed due to the common handling of negative and positive symmetries.

According to an exemplary embodiment, separate treatment of odd and even point symmetry can be provided. Expediently, the splitting takes place before the entering into the voting matrix: Instead of a common, signed voting matrix, two unsigned voting matrices are then provided, the voting weights for negative symmetries being entered in the first voting matrix and voting weights for positive symmetries entered in the second voting matrix. Here a potentially interesting advantage arises: Patterns can also be constructed and taken into account by the detection algorithm that simultaneously have odd and even point symmetry and whose center of symmetry coincides locally. Such a mixed symmetry shape is very unusual, but this unusualness ensures that confusion with patterns occurring randomly in the images is extremely unlikely. The two voting matrices are then to be searched for maxima that are present in the same location in both maps. Another possible advantage through the separate treatment of odd and even point symmetry is the easier parallelizability and thus, possibly, faster execution. This is because through the use of two voting matrices, access conflicts can be avoided when entering the voting weights, which saves waiting times.

Figure 13:
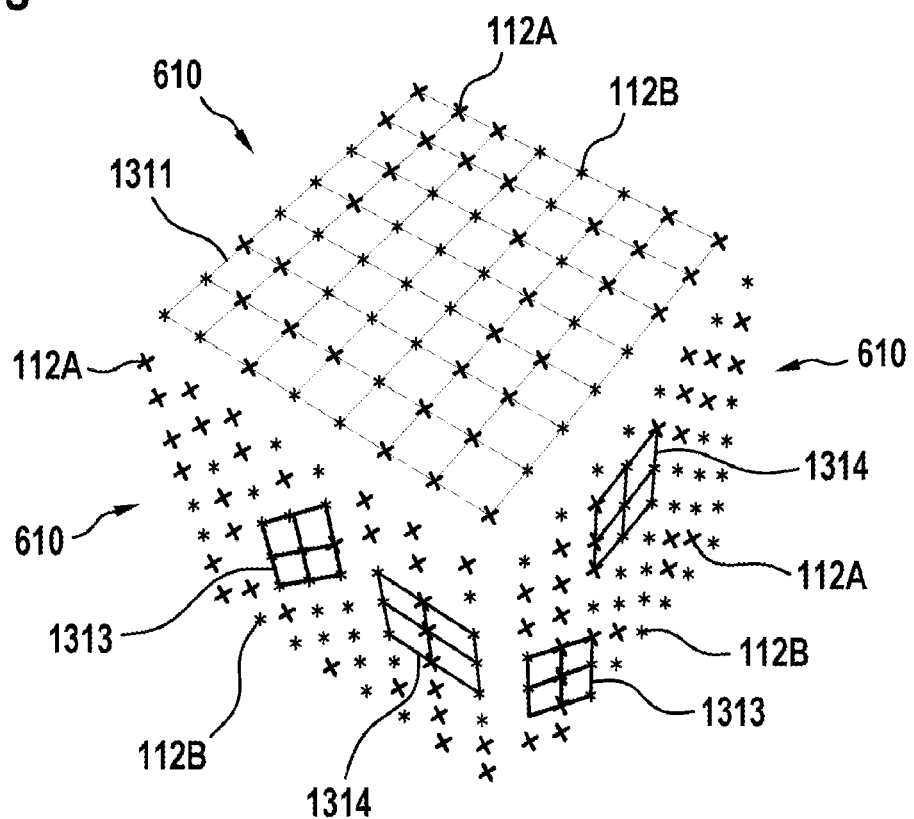
FIG. 13 shows a schematic representation of exemplary patterns configured in the shape of a cube according to an example embodiment of the present invention, with regard to a correct identification of a grid.

FIG. 13 shows a schematic illustration of patterns 610 configured as an example in a cube shape, according to an exemplary embodiment, with regard to a correct identification of a grid 1311. The patterns 610 shown in FIG. 13 are, for example, patterns from FIGS. 7 and 8, respectively, of which three are configured here in a cube shape. Of the patterns 610, detected or identified centers of symmetry 112A and 112B of respective predefined point-symmetric regions of the patterns 610 are shown; optionally, signs and values of the associated extrema in the voting matrix may also be known. Here, first centers of symmetry 112A are associated with predefined point-symmetric regions having odd point symmetry and second centers of symmetry 112b are associated with predefined point-symmetric regions having even point symmetry. For one of the patterns 610, a correct grid 1311 is drawn in, on which the predefined point-symmetric regions and thus the centers of symmetry 112A and 112B are aligned. For the other two patterns 610, the correct grids are to be sought; in addition, in FIG. 13 incorrect grid search solutions are illustrated by first markings 1313 and correct grid search solutions are illustrated by second markings 1314.

Finding the associated correct grids is a task that has ambiguities. After the odd/even coded centers of symmetry 112A and 112B have been detected, the next step is often to group them and to ascertain to which pattern 610 this group should be assigned, since it is not always known in advance which and how many patterns 610 are contained in the image. Part of this task can include finding the grids 1311 on which the centers of symmetry 112A and 112B are located. Instead of square grids 1311, other topologies for the configuration of centers of symmetry 112A and 112B are also possible, e.g. annular concentric configurations; see e.g. the second partial representation in FIG. 6. As a representative example, square grids 1311 are considered below.

The task of determining the location of the correct grid for all patterns 610 solely from the positions of the centers of symmetry 112A and 112B in FIG. 13 presents an ambiguous problem under some circumstances. Looking at the pattern 610 in FIG. 13, for which the correct grid 1311 is already drawn in, it is not difficult (for the observer) to indicate the correct grid 1311. However, for the other two patterns 610, acquired by the camera from a significantly more oblique perspective, it is clear that the output may be ambiguous. Several possible solutions exist as to how a grid could be placed through the centers of symmetry 112A and 112B. Here the solution that first seems most obvious when regarded locally, i.e. the solution with nearly perpendicular axes, is not the correct one, as can be seen from the first markings 1313. The second markings 1314, on the other hand, are correctly situated on the grid. This shows that a naive approach, e.g. finding the nearest neighbors of the respective center of symmetry, may possibly lead to a wrong solution if the perspective is oblique. In practice, solutions with a very oblique perspective are ruled out because the centers of symmetry 112A and 112B can then no longer be found.

Figure 14:
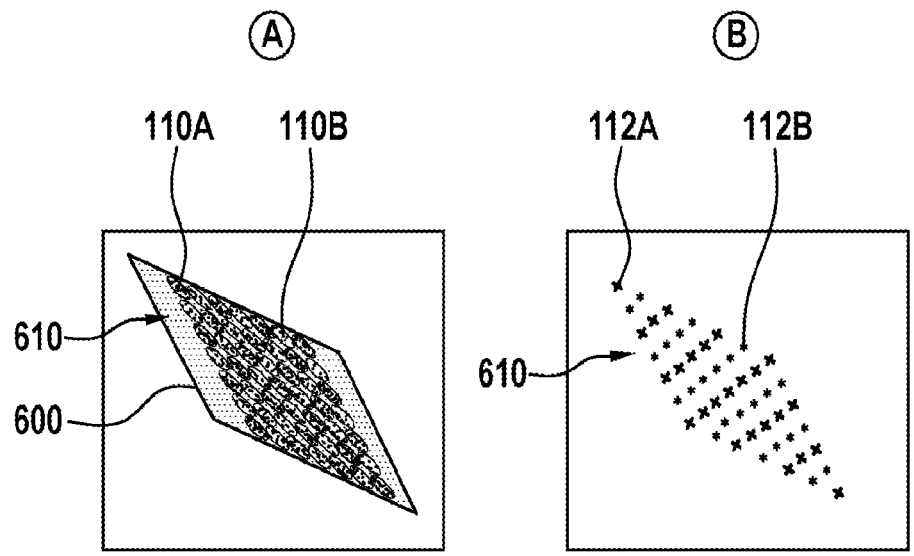
FIG. 14 shows a schematic representation of the pattern shown in the first partial representation of FIG. 6, in oblique perspective.

FIG. 14 shows a schematic view of pattern 610 shown in the first partial view of FIG. 6, in an oblique perspective. In a first partial representation A, FIG. 14 shows display medium 600 with the pattern 610 of predefined point-symmetric regions 110A and 110B. In a second partial representation B, FIG. 14 shows centers of symmetry 112A and 112B of pattern 610, identified or detected by the device for providing of FIG. 1 or a similar device and/or the method for providing of FIG. 3 or a similar method. Centers of symmetry 112A and 112B have been detected and at least their positions are available.

FIG. 15 shows pattern 610 from the first partial representation of FIG. 14, with highlighting of a predefined point-symmetric region 110B. Here, a predefined even point-symmetric region 110B is graphically highlighted, as an example only, to illustrate a distortion of the pattern 610 or the regions 110A and 110B due to the oblique perspective. The point-symmetrical regions 110A and 110B, which are predefined here as circular as an example, are distorted to form ellipses by the oblique perspective.

In the following, with specific reference to FIG. 14 and FIG. 15 and with general reference to the figures described above, a reconstruction of the correct grid or topology of pattern 610 is discussed.

From an oblique perspective, each circular region 110A and 110B from which the votes for the respective center of symmetry 112A and 112B originate, becomes an ellipse. By tracking back the votes that contributed to the respective center of symmetry 112A, 112B, for example the center of symmetry 112 B with even point symmetry highlighted in FIG. 15, the shape and orientation of the respective ellipse can be inferred. The direction and relation of the main axes of the ellipse disclose how it can be stretched or rectified to transform it back into a circle. The predefined even point-symmetric region 110B, highlighted as an example, of the pattern 610, is now considered which contributes to the highlighted point symmetry center 112B. By design or construction, this region 110B is circular or approximately circular, e.g. hexagonal. From an oblique perspective, this circle becomes an ellipse. When voting to identify the center of symmetry 112B, symmetric pairs of points that lie within this ellipse contribute to the formation of the extremum in the voting matrix.

According to an exemplary embodiment, tracing back takes place to the origin in the camera image of the pairs of points that led to the formation of a sufficiently strong extremum. For this purpose, a further processing step is carried out. It is first assumed that the voting has already taken place and that the sufficiently strong centers of symmetry have already been found. The starting point is therefore a situation as shown in the second partial representation B of FIG. 14. In the following, the process of voting is run through again in a modified form. However, the already existing voting matrix is not newly formed again here. Instead, for each symmetric pair of points that would supply a contribution to the voting matrix, it is checked whether the contribution would contribute to one of the found centers of symmetry 112A, 112B, and thus has already contributed in the first pass. If this is the case, the two positions of the point pair will be saved or immediately further calculated. Advantageously, the index of the center of symmetry 112A, 112B to which the symmetric point pair contributes is also stored or used here. In this way, all contributions to the successful centers of symmetry can be subsequently ascertained and (temporarily) stored or further used.

For the start of the further processing step, it is not necessary to wait for the end of the first processing step, i.e. the formation of the voting matrix and ascertaining of the centers of symmetry; rather, it is possible to start beforehand and to use the already finished intermediate results, i.e. found centers of symmetry 112A, 112B, of the first processing step. In the information formed in this way, for each found center of symmetry 112A, 112B it is then possible to read off all the image positions that contributed thereto. These positions substantially, or except for some outliers, lie within the ellipse, as shown as an example in FIG. 15 for a center of symmetry 112B.

Methods for ascertaining the parameters of this ellipse are conventional to those skilled in the art. For example, a major axis transformation can be formed over the set of all points contributing to a center of symmetry 112A, 112B, in order to determine the orientation of the major axes and the two diameters of the ellipse. This is even possible without having to buffer the contributing image positions: Instead, they can be used for further calculation immediately after they become known. Alternatively, the elliptical envelope around the set of points can be ascertained, which encloses as large a portion of the set of points as closely as possible, excluding any outliers.

Instead of storing a set of points as a list, an index image, equivalent to an index matrix, can alternatively be created. It serves the same purpose, namely the formation of the parameters of all ellipses, but it stores the information in a different form. The index image is ideally the same size as the signature image and is set up to store indices, specifically the indices associated with the found centers of symmetry 112A, 112B. A special index value, e.g. 0, is provided to indicate that there is no entry yet. If a symmetric point pair or signature pair that contributes to an i-th index is found when running through the further processing step, then the index i is entered at each of the two associated locations of the respective signatures. Thus, at the end of the pass, an index image is obtained in which all the indices associated with the centers of symmetry 112A, 112B each occur multiple times, forming ellipse-shaped regions: Apart from a few outliers, each ellipse-shaped region then contains only entries having a uniform index, as well as the index 0 at the unused positions. The index image can then be easily evaluated in order to determine the parameters of the individual ellipses. Otherwise, it is not necessary to store the index image completely. As soon as the data in a partial section of the index image no longer change, this part can already be evaluated and the memory can subsequently be released again. This also results in lower time latency, so that intermediate results can be provided earlier.

With the known ellipse parameters, the two-dimensional configuration of the detected centers of symmetry (see FIG. 14) can then be rectified so that they subsequently lie on the grid of pattern 610, which is here at least approximately square, by way of example only.

Figure 16:
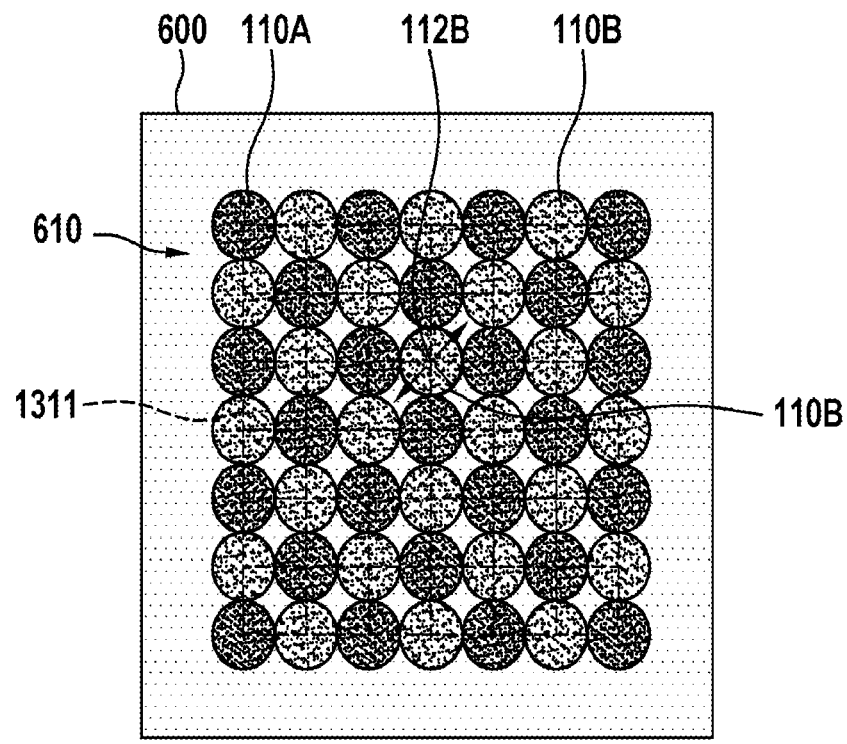
FIG. 16 shows a schematic representation of the pattern of FIG. 15 after a perspective rectification according to an example embodiment of the present invention.

FIG. 16 shows a schematic representation of the pattern 610 of FIG. 15 after perspective rectification according to an exemplary embodiment. In other words, FIG. 16 shows, for illustration, the pattern 610 of FIG. 15 after it has been stretched normally or perpendicularly to the direction of the found ellipse or of the highlighted elliptically distorted region 110B, by the ratio of the two major axis lengths. In this way, the correct grid 1311 can be found easily. Compared to FIG. 15, the ellipse is thus rectified such that the original circular shape of region 110B is restored. Subsequently, it is easy to ascertain the grid 1311 on which the centers of symmetry 112A and 112B lie, or to ascertain the neighborhood relationships between the centers of symmetry 112A and 112B without error. FIG. 16 is used here for illustration only. In practice, it is not necessary to carry out a warping the image. Since the information about the positions of the centers of symmetry 112A and 112B is already available in a condensed form, it makes sense to continue working only with these data and to transform their coordinates, forming the transformation rule from the ascertained ellipse parameters, in such a way that the ellipses become circles.

In the case of camera images taken at telephoto focal length, one global transformation per partial section may be sufficient to determine raster 1311. In the case of camera images taken with a wide-angle lens (e.g. fisheye lens), local transformations can be used at least in partial regions. Thus, the above-named transformation rule can be applied globally and/or locally. In the global variant, all projection centers are transformed with the same, common transformation rule. In many cases, this makes sense and is sufficient. The common transformation rule can be formed from the joint consideration of all the ellipses. If the centers of symmetry 112A and 112B are spatially located on multiple surfaces, the ellipses can be divided into groups according to their parameters. The ellipses belonging to a surface here have very similar parameters, in particular if the surface is flat. A global transformation rule can then be ascertained and applied per group. This approach is appropriate for telephoto focal length. The local transformation is useful when the majority of the circular regions are mapped into differently shaped or differently oriented ellipses by the imaging of the camera. This is the case in particular with wide-angle cameras or strongly distorting lenses.

After applying the transformation, the center of symmetry positions that belong to the same surface are at least approximately on a common grid 1311. The next task is to assign the centers of symmetry 112A and 112B to the grid positions. This can be done e.g. iteratively in small steps. For example, for a center of symmetry 112A, 112B, up to four nearest neighbors are sought that are approximately equidistant; on this see also the markings of FIG. 13. From the neighbors, one continues to travel to the further neighbors until all acquired centers of symmetry 112A and 112B that belong to a pattern 610 are assigned to a common grid 1311 or can be excluded therefrom. That is, if, during this search, centers of symmetry are found that do not fit the grid 1311 currently under consideration in terms of distances, they are not included because they are probably outliers or centers of symmetry that belong to other surfaces. This iterative search can be repeated for the other surfaces so that in the end, except for the outliers, each center of symmetry 112A, 112B is assigned to a surface. An identification of the patterns 610 can then be performed for the surfaces, preferably based on the binary coding connected with the centers of symmetry 112A and 112B, contained in each case in the sign of the extremum.

Figure 17:
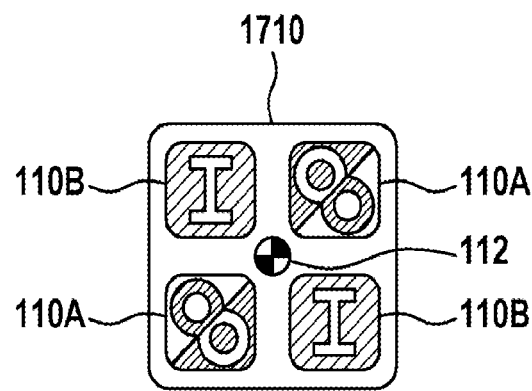
FIG. 17 shows a schematic representation of an example embodiment of a pattern with hierarchical symmetry, according to the present invention.

FIG. 17 shows a schematic representation of an exemplary embodiment of a pattern 1710 with hierarchical symmetry. Pattern 1710 corresponds to or is similar to a pattern shown in the figures described above. More specifically, the pattern 1710 has a two-level hierarchy of, as an example only, four predefined point-symmetric regions 110A and 110B. According to the embodiment shown here, the pattern 1710 has, as an example only, two predefined odd point-symmetric regions 110A and two predefined even point-symmetric regions 110B. The pattern 1710 as a whole is here constructed as odd point-symmetrical. On a first hierarchy level are situated the intrinsically even point-symmetric regions 110B and the intrinsically odd point-symmetric regions 110A. On a second hierarchy level is situated the overall configuration of the odd point-symmetric pattern 610B. Center of symmetry 112 of the second hierarchy level is identified by the circle divided into quarters.

Figure 18:
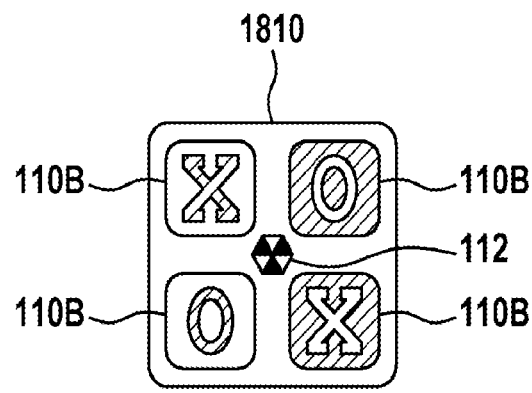
FIG. 18 shows a schematic representation of an embodiment of a pattern with hierarchical symmetry, according to the present invention.

FIG. 18 shows a schematic representation of an exemplary embodiment of a pattern 1810 with hierarchical symmetry. Pattern 1810 in FIG. 18 is similar to the pattern in FIG. 17. More specifically, FIG. 18 shows another example of a two-level hierarchy of predefined point-symmetric regions 110B. In the first hierarchy level, the predefined point-symmetric regions 110B are each intrinsically even point-symmetric. In the second hierarchy level, there is odd point symmetry at the level of pattern 1810, with the center of symmetry 112 at the center of a hexagon divided into six parts, shown for illustration. The odd symmetry is expressed here in an inversion of the predefined point-symmetric regions 110B, e.g. dark symbol on light background is reflected in light symbol on dark background.

Figure 19:
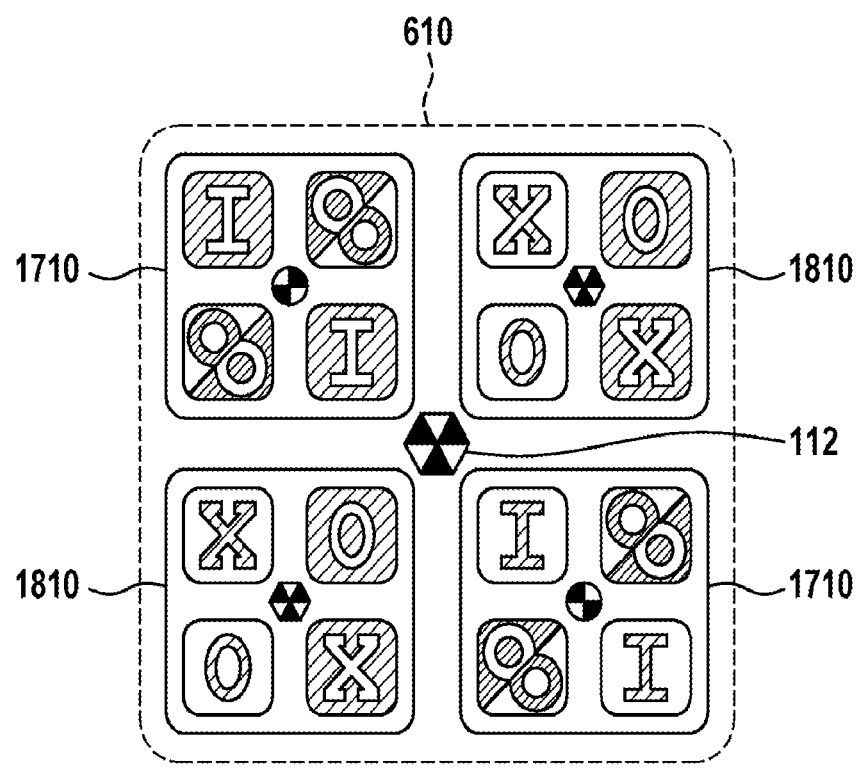
FIG. 19 shows a schematic representation of an example embodiment of a pattern with hierarchical symmetry, according to the present invention.

FIG. 19 shows a schematic representation of an exemplary embodiment of a pattern 610 with hierarchical symmetry. In this case, pattern 610 is constructed from patterns 1710 and 1810 of FIG. 17 and FIG. 18, or their inverted and/or point-mirrored form. Pattern 610 has a three-level hierarchy of, as an example only, two patterns 1710 from FIG. 17 and two patterns 1810 from FIG. 18. Patterns 1710 and 1810 are odd and thus inverted point-mirrored at the center of symmetry 112 of pattern 610, at the center of a hexagon divided into sixths, shown for illustration. For example, pattern 1710 shown at lower right in FIG. 19 is an inverted form of pattern 1710 at upper left. This hierarchical principle can be continued as desired, so that a fourth and fifth level can also be constructed, and so on.

With reference to FIG. 17, FIG. 18, and FIG. 19, patterns with hierarchical symmetry are discussed further below. The symmetrical patterns 610, 1710, 1810 can be constructed in multiple levels, so that, for example, in a first hierarchical level there are smaller intrinsically symmetrical regions, whose joint consideration results in a symmetry at the next higher hierarchical level. FIG. 17 and FIG. 18 each show examples of how a two-level hierarchical pattern 1710 and 1810, respectively, may be constructed. Based on this, a three-level hierarchical pattern 610 is constructed in FIG. 19. The example in FIG. 19 thus contains three hierarchy levels. The third hierarchy level is extended over the entire surface of pattern 610 (dashed framed region) and includes center of symmetry 112.

In the second hierarchy level, there are the four patterns 1710 and 1810 (each framed with a solid line), each with a center of symmetry in the center (not explicitly designated here). In the first hierarchy level, according to the embodiment shown here there are consequently 16 predefined point-symmetric regions, each with a center of symmetry. The symmetry of the third hierarchy level is already visible from a greater distance. During an approach, the four symmetries of the second hierarchy level also become visible. At shorter distances, or when the acquired resolution of pattern 610 is sufficient, the symmetries of the first hierarchy level also become visible. Thus, for example, a visual controlling (visual servoing) of e.g. a robot, e.g. in the direction of the pattern 610 or in any other direction over a large distance range can be enabled. It is generally not necessary to acquire coarser or higher hierarchy levels if finer or lower hierarchy levels can already be acquired. Furthermore, it is not necessary to be able to capture all symmetries of the respective hierarchy level at the same time, for example if it is no longer possible to acquire the entire pattern 610 in the camera image at a very short distance. It is obvious that even and odd symmetries may be in part freely chosen and combined. Additional information can also be included in this determination, in particular one bit each for the choice between odd and even symmetry, and such additional information may be transmitted to an acquiring system in this way. "In part freely" means here that the remaining part of the symmetry forms on the respective hierarchy level results necessarily from the next higher hierarchy level. In other words, e.g. in FIG. 18 the patterns "X" and "O" can be freely selected for the top row. The second row then results necessarily, here with inversion, because on the next hierarchy level a negative point symmetry is chosen.

Figure 20:
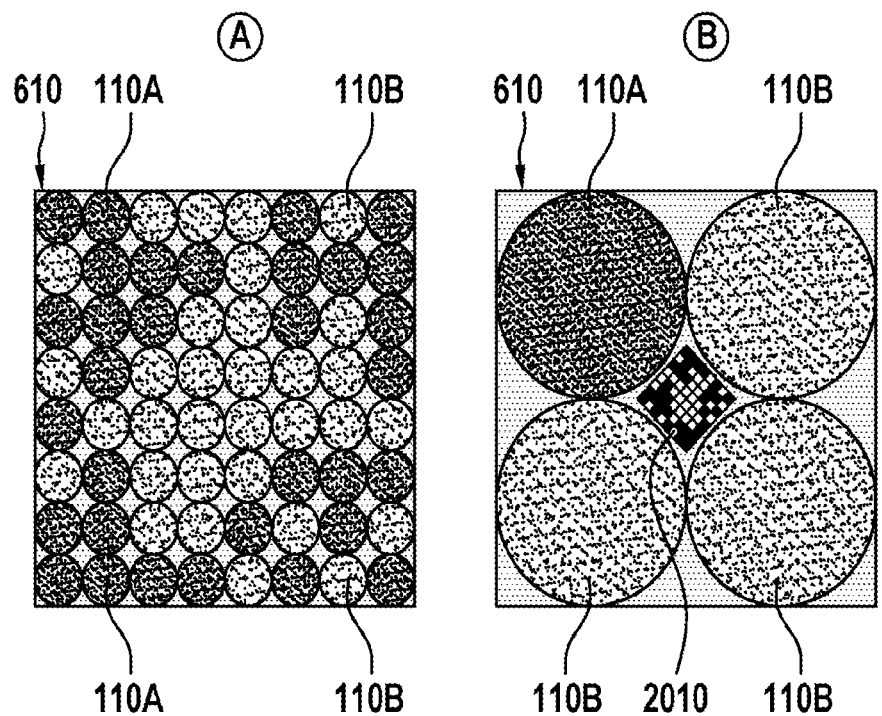
FIG. 20 shows schematic representations of patterns according to example embodiments of the present invention.

FIG. 20 shows schematic representations of patterns 610 according to exemplary embodiments. In a first partial representation A, FIG. 20 shows a pattern 610 that is, as an example, one of the patterns of FIG. 8. The first partial representation A of FIG. 20 is an example of implicit additional information, here, as an example only, 8·8=64 bits, which is obtained based on the symmetry type or associated sign of the point symmetry of the predefined point-symmetric regions 110A and 110B of pattern 610. In a second partial representation B, FIG. 20 shows a pattern 610 that is constructed from, as an example only, four predefined point-symmetric regions 110A and 110B, here for example one predefined odd point-symmetric region 110A and three predefined even point-symmetric regions 110B on a square grid. Furthermore, a code matrix 2010 for explicit additional information is situated in pattern 610 here. By way of example only, code matrix 2010 contains the implicit additional information from the first partial representation A in an explicit manner. Here, the predefined region 110A with odd point symmetry identifies or marks the beginning line of the 8·8 matrix, so that a readout sequence is clearly defined.

In the following, a communication of implicit or explicit additional information will be further discussed with reference to FIG. 20.

It may be useful or necessary to communicate additional information to a receiver, such as a computer, autonomous robot, etc., based on the pattern 610. The additional information can be more or less extensive. Some illustrative examples of additional information include stopping location, pick up load, position at location 52° 07'01.9"N 9° 53'57.4"E facing southwest, turn left, maximum speed 20 km/h, charging station for lawn mower, etc. There are various possibilities for communication using the imaging sensor or the camera. In particular, a distinction can be made between implicitly and explicitly contained additional information; see the two examples in FIG. 20, where 64 bits of additional information are provided, once implicitly and once explicitly. Implicit additional information means that this information is included in the symmetric patterns 610 themselves in some way, while explicit additional information is generally formed and acquired separately from these patterns 610.

One possibility for communicating implicit additional information is illustrated by the first partial representation A in FIG. 20: implicit additional information as binary code. Since the choice between odd and even point symmetry is made for each symmetric region 110A and 110B in the construction of pattern 610, additional binary information (corresponding to 1 bit) can thus be transmitted in each case. If patterns are also allowed which are odd and even point-symmetric at the same time, the binary additional information becomes ternary additional information, i.e. three cases instead of two.

Another possibility for transmitting additional information arises from the use of uneven spacings between the centers of symmetry of regions 110A and 110B, i.e. implicit additional information based on the configuration. Unlike the configuration shown in FIG. 20, where the centers of symmetry lie on a square grid, these would then be configured irregularly, the additional information, or a part of it, being encoded in this configuration. Example: If one allows that the respective center of symmetry may be displaced by a fixed distance to the left/right and up/down, this results in 9 possible positions, whereby $\log_2(9)=3.17$ bits of additional information can be encoded per center of symmetry. Oblique perspectives between the imaging sensor and pattern 610 do not present a problem in any of the above possibilities. For example, a part of the centers of symmetry (for example, the outermost four in the corners) can be used to define a coordinate system or the regular base grid. The deviations or binary—/ternary codes used for coding then relate to this basic grid.

The symmetric regions 110A and 110B for implicit additional information should not be too small, so that sufficiently prominent extrema are formed in the voting matrix. If a larger amount of additional information (especially static, location-bound) is to be communicated to the receiver (e.g. a mobile robot), it can be advantageous to explicitly encode this information.

In the second partial representation B of FIG. 20, it is shown how, in particular, static, location-bound additional information can be explicitly transmitted to the receiver (e.g. a mobile robot): it can be agreed, for example, that in a coordinate system defined by the centers of symmetry there is further information at certain coordinates, which is coded for example in binary (black/white) or in further gradations (gray levels) or in colors. The procedure then has two steps: In a first step, odd and even symmetries are used to find a field, for example code matrix 2010, in which further information is encoded. In a second step, the field and thus the information in it is read out. Oblique perspectives between imaging sensor and pattern 610 do not present a problem here, because for reading out the explicit additional information it is necessary neither for the basis vectors of the found coordinate system to be perpendicular to each other, nor for them to be of equal length. Optionally, the image can also be rectified in such a way that a Cartesian coordinate system is subsequently available. Optionally, a display can also be installed in the field with pattern 610 that in addition to time-static information can also transmit time-variable information and/or that can transmit information about the time-variable information.

There can also be an item of high-resolution additional information contained in pattern 610 itself, with implicit error detection. Thus, another possibility for communication (especially static, location-bound) additional information exists via the pattern 610 itself: That is, the additional information is contained in the sequence of black and white or color or grayscale pattern 610 itself. With the above classification, this item of additional information would be both implicit and explicit. Because pattern 610, or at least parts thereof, has symmetries, the additional information is automatically contained redundantly, typically twice in each case. This holds for both odd and even point symmetry. This fact can be exploited for error correction or error detection. If, for example, a pattern 610 is soiled, for example by bird droppings, it is possible with a high degree of certainty to detect the resulting error in the additional information, because the same error will, with very high probability, not be present at the associated symmetrical position.

In the following, in particular the background and embodiments with regard to the device for calibration of FIG. 1 or a similar device and/or the method for calibration of FIG. 4 or a similar method are discussed again.

Regarding the background of the calibration of cameras, the following is to be noted. In camera calibration, a distinction is made between intrinsic and extrinsic calibration. Intrinsic calibration has to do with capturing and describing the image through the lens onto the image sensor. Here parameters such as focal length and image principal point are determined, but also the deviations of the optical image from an ideal model, e.g. the pinhole camera model. In extrinsic calibration, the external orientation of the camera, i.e. its position and orientation, e.g. with respect to a given coordinate system (e.g. vehicle coordinate system or second camera), is ascertained. To carry out the calibration, special calibration targets are photographed multiple times with the camera, with calibration patterns being applied e.g. to mobile flat panels or three-dimensional bodies. Between exposures, the relative placement between the camera and the calibration target is usually varied. The acquired images of the camera to be calibrated are usually evaluated automatically. Here the position of the intersection points or corner points (e.g. of a checkerboard pattern) or circle centers, etc., are ascertained automatically. Such points are also referred to as outstanding points in the following. The sought calibration parameters can then be ascertained from a plurality of such exposures and the outstanding points ascertained from them, e.g. using a bundle compensation procedure. Usually, a calibration target is acquired in more than one image. It is then desirable to recognize when it is the same target. In addition, it is expedient to also acquire the orientation of the target in order to eliminate ambiguities. For example, a simple checkerboard pattern with 8×8 squares has an ambiguity when rotated 180° about the surface normal. Taking orientation into account is important in particular because in practice the targets are not ideal, e.g. are not perfect planes, and therefore the deviations must also be estimated if the results are to be highly accurate.

In order to be able to ascertain the targets and their orientation automatically and unambiguously, they are often provided with a coding. For example, a smaller circle in a complementary color (i.e. black circle in white square or white circle in black square) can be inserted into a part of the squares or circles for this purpose. An item of binary information (1 bit) can be provided in each case about its presence or absence. The spaces between the circles can also contain e.g. small circles for coding. Other variants exist for the coding, e.g. with QR codes, ArUco codes, proprietary codes, etc. Instead of distributing the coding over the surface, it can also be contained only in the border. In this case, for example an ordinary checkerboard pattern is surrounded by a border of codes. However, such targets have the disadvantage that part of their surface is required exclusively for the codes and is therefore no longer available for calibration via outstanding points. Bright areas of a given pattern may conventionally also be made retroreflective in order to obtain a high light yield on the calibration target with a light source close to the camera. For example, a random pattern composed of noise patterns with different spatial frequencies can also be used for calibration. Thus, while at first glance it resembles the patterns 610 of FIG. 6 or similar patterns, it does not contain point symmetries.

Figure 21:
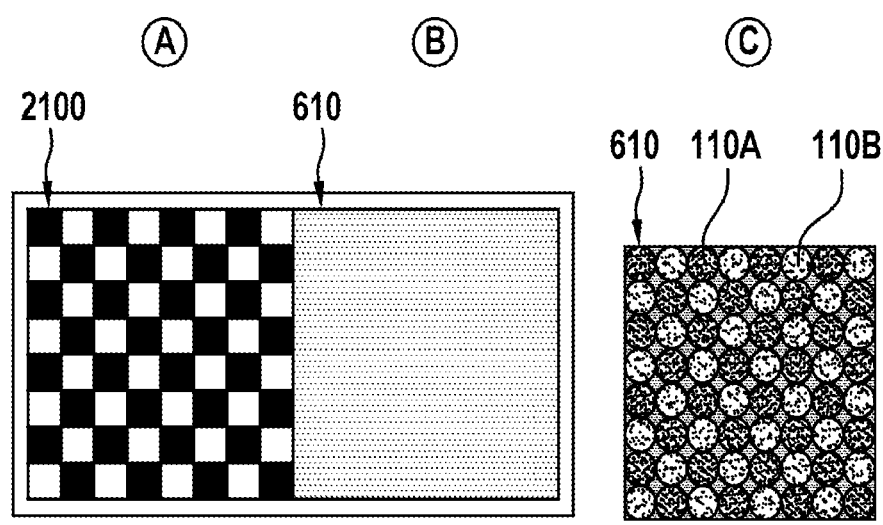
FIG. 21 shows a schematic side-by-side view of a conventional checkerboard pattern and an example embodiment of a pattern of predefined point-symmetric regions according to the present invention.

FIG. 21 shows a schematic juxtaposition of a conventional checkerboard pattern 2100 and an exemplary embodiment of a pattern 610 of predefined point-symmetric regions 110A and 110B. In FIG. 21, checkerboard pattern 2100 is shown in a first partial representation A, pattern 610 from the first partial representation of FIG. 6 or a similar pattern and highlighted predefined point-symmetric regions is shown in a second partial representation B, and pattern 610 with highlighted predefined point-symmetric regions 110A and 110B is shown in a third partial representation C. By way of example only, pattern 610 includes 25 first predefined point-symmetric regions 110A having odd symmetry and 24 second predefined point-symmetric regions 110B having even symmetry.

Figure 22:
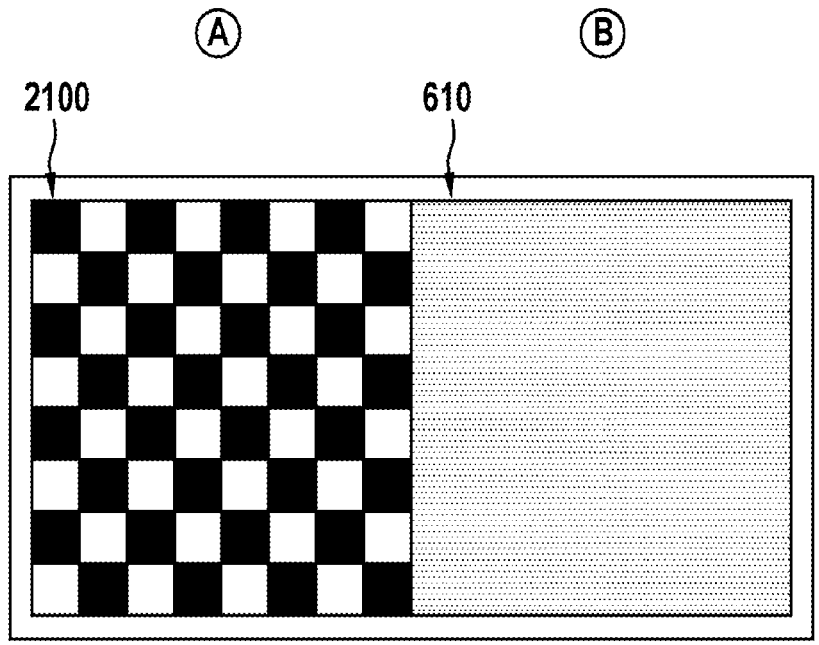
FIG. 22 shows a schematic representation of the checkerboard pattern and the pattern of FIG. 21 under the influence of a combination of unsharpness and nonlinearity.

FIG. 22 shows a schematic representation of checkerboard pattern 2100 and pattern 610 of FIG. 21 under the influence of a combination of blurring and nonlinearity. More precisely, FIG. 22 shows the first partial representation A and the second partial representation B from FIG. 21 under the influence of a combination of blurring and nonlinearity. In other words, FIG. 22 includes an illustration or simulation of effects that occur in optical systems: the combination of unsharpness and nonlinearity. These lead here to the effect known from photography of "burned out" or "blown-out highlights," with running of the bright regions into the neighborhood. This makes the white checkerboard squares larger than the black ones.

Figure 23:
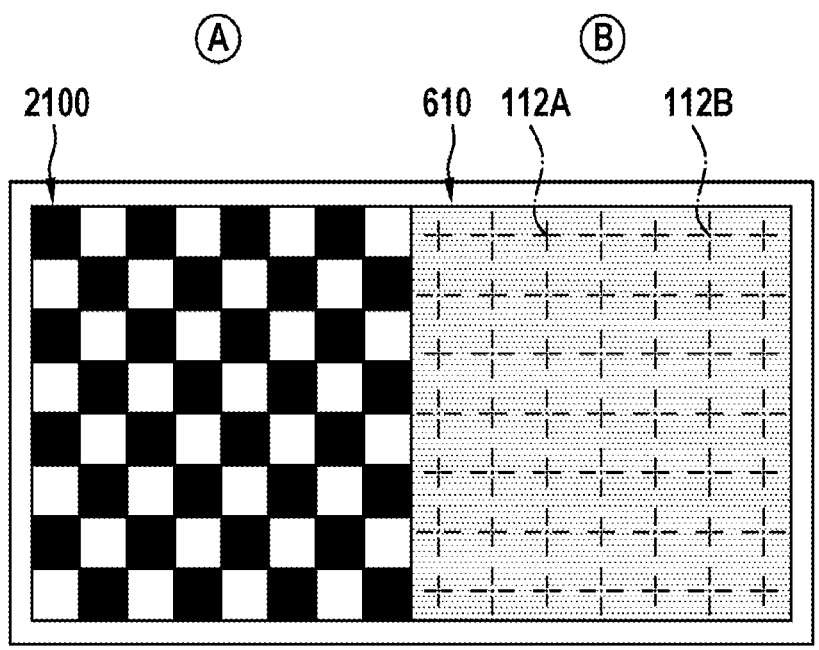
FIG. 23 shows a schematic representation of the checkerboard pattern and the pattern of FIG. 21 and FIG. 22, respectively, with identified centers of symmetry of the pattern.

FIG. 23 shows a schematic representation of checkerboard pattern 2100 and pattern 610 of FIGS. 21 and 22, respectively, with identified centers of symmetry 112A and 112B of pattern 610, similar to the second partial representation in FIG. 14. In other words, FIG. 23 illustrates a findability of the outstanding points in the disturbed image. While the intersection points on checkerboard pattern 2100 of first partial representation A can no longer be determined unambiguously, finding centers of symmetry 112A and 112B of pattern 610 in second partial representation B functions in a simple and accurate manner.

To illustrate at least a portion of the effects described, in FIGS. 21, 22, and 23 the conventional checkerboard pattern 2100 and the planar pattern 610 are juxtaposed with embedded point symmetries. The third partial representation C in FIG. 21 reveals that these are 7×7 circular, point-symmetric regions 110A and 110B. The number of outstanding points thus corresponds to that on checkerboard pattern 2100, because 8×8 squares yield 7×7 crossing points. For FIG. 22, two of the effects relevant to practice, namely blurring and nonlinearity, were simulated. If checkerboard pattern 2100 is regarded in enlarged form, it will be seen that the formerly outstanding points (intersection points) become smeared and thus ambiguous, because the white squares "bleed over" into the neighboring black squares, as is known from practice. Ascertaining the outstanding points locally becomes a guessing game, especially when other effects, such as noise, are added. Although pattern 610 also looks altered in FIG. 22, centers of symmetry 112A and 112B can be readily found, as is shown in FIG. 23. It can be seen that, despite the disturbances, there are no problems finding the outstanding points, which are also all accurately located on the grid. Here it is advantageous that it is not necessary to decide locally on the position of the respective outstanding point; rather, in each case a whole surface piece contributes to the localization of a center of symmetry 112A, 112B. The effects acting on the surface piece, such as blurring or nonlinearity, do not have any influence on the position of the center of symmetry 112A, 112B. To this extent, with regard to locating the outstanding points the proposed patterns 610 are more invariant to the typical disturbances in the image acquisition process than the conventional black and white patterns with squares and circles. According to exemplary embodiments, a camera calibration with point symmetries or two-dimensional point-symmetric patterns 610, as well as a dense calibration, are thus enabled.

If patterns are used having, for example, 7×7=49 outstanding points (as in some previous examples) for the calibration, it is obvious that a statement about the optical imaging can also be obtained only for the 49 sight rays between the points on the target and their image on the sensor. In practice, therefore, dozens or hundreds of images are taken for a calibration, and the relative configuration between camera and target is constantly changed repeatedly in between. However, it is obvious that the coverage remains sparse nonetheless. Therefore, an interpolation has to be performed for the pixels that are not acquired. This corresponds to the conventional procedure.

According to embodiments, this can be improved and a dense calibration can be determined; i.e., the previously necessary interpolation can be replaced by a measurement for each pixel. For this purpose, the centers of symmetry 112A, 112B are found in the given camera image. They represent the outstanding points. Centers of symmetry 112A, 112B are associated with pattern 610 or patterns 610, depending on whether there is one or a plurality of patterns 610 in the image. Often, multiple patterns 610 are involved in the calibration, which can form multiple surfaces of one or more targets. In the following, only one sample is considered as a representative example. The pattern 610 is identified based on the contained coding, as is also explained with reference to FIG. 20, for example. The procedure described with reference to FIG. 13 to FIG. 16 can also be used here for a local rectification of the perspective, so that circles compressed into ellipses become circles again. At this point, for each found center of symmetry 112A, 112B it is known where it belongs on the identified pattern 610, i.e. there is a point-to-point mapping. Based on the code, the reference pattern image is loaded from the memory. Alternatively, it can be formed on the fly as needed, because the formation rule requires much less memory than the reference pattern image itself. In this way, e.g. in the calibration software or in a database, a very large number of formation rules for different patterns can be stored without taking up a large amount of memory space.

This now makes it possible to compare pattern 610 acquired by the camera to be calibrated with the reference pattern, point by point or pixel by pixel, i.e., densely. This can be done either in the coordinates of the camera image or in the coordinates of the reference image or in another, independent coordinate system. The point-to-point mapping for the outstanding points, already known at this point, makes it possible to register the two images to be compared to each other. In other words, for these few (e.g. 49) points the mapping is already known, but for the millions of other pixels it is not yet known. At this point, for example, an interpolation can be started that uses the known outstanding points as support points. With this interpolation, an approximate solution for mapping the observed pattern 610 to the reference pattern can be indicated. This approximate solution is used as initialization for the search that finally follows. This can be done using dense optical flow methods conventional to those skilled in the art. The search has the goal of being able to specify, for each point or pixel or sub-pixel of the observed pattern 610, onto which point or pixel or sub-pixel of the reference pattern it is mapped, or vice versa, as required. A good initialization is advantageous here, since a remaining uncertainty and thus a remaining search region are small. Accordingly, the search effort is also small and the calibration method can be performed quickly and/or with a small computer unit.

As a result, a dense mapping is obtained indicating a measured, not just interpolated, mapping to a point of the reference pattern for each point of the observed pattern 610. Or vice versa. This dense mapping is used for the calculation of the calibration. The dense calibration formed in this way is particularly accurate and a minimum number of recorded camera images is also required, especially compared to a conventional calibration, because per recorded image information is obtained not only for the outstanding points, but for all points of the respective pattern 610.

If an exemplary embodiment includes an "and/or" linkage between a first feature and a second feature, this is to be read as meaning that the embodiment includes both the first feature and the second feature according to one specific embodiment, and has either only the first feature or only the second feature according to another specific embodiment.

What is claimed is:

1. A method for providing calibration data for calibrating a camera, the method comprising the following steps:
   reading in image data provided by the camera from an interface to the camera, the image data representing a camera image of at least one predefined even and/or odd point-symmetric region in an environment of the camera;
   determining at least one center of symmetry of the at least one even and/or odd point-symmetric region using the image data and a determination rule;
   performing a comparison of a position of the at least one center of symmetry in the camera image with a predefined position of at least one reference center of symmetry in a reference image relative to a reference coordinate system to determine a positional deviation between the center of symmetry and the reference center of symmetry; and
   ascertaining displacement information for at least a subset of pixels of the camera image relative to corresponding pixels of the reference image using the positional deviation, the calibration data being provided using the displacement information.

2. The method as recited in claim 1, wherein the determination rule used in the step of determining is configured to bring about:
   a signature being generated for a plurality of pixels of at least a portion of the camera image in order to obtain a plurality of signatures, each of the signatures being generated using a descriptor with a plurality of different filters, each filter having at least one symmetry type, each of the signatures having a sign for each filter of the descriptor,
   at least one mirror signature for at least one symmetry type of the filters being ascertained for the signature,
   a pixel having the signature being checked for presence of at least one further pixel having a signature corresponding to the at least one mirror signature in a search region in an environment around the pixel in order to ascertain, given a presence of least one further pixel, pixel coordinates of at least one symmetrical signature pair from the pixel and a further pixel, and
   the pixel coordinates of the at least one symmetric signature pair being evaluated in order to identify the at least one center of symmetry, and/or at least one reflector being applied to the sign of one of the signatures in order to ascertain the at least one mirror signature, each reflector having rules for modification of the sign that are specific to a symmetry type and are a function of the filters of the descriptor, the search region being a function of at least one of the applied reflectors.

3. The method as recited in claim 2, wherein in the step of determining, for each already determined center of symmetry, using pixel coordinates of each symmetric signature pair that contributed to the correct identification of the center of symmetry, a transformation rule is determined for transforming pixel coordinates of the center of symmetry and/or of the at least one even and/or odd point-symmetric region, the transformation rule being applied to pixel coordinates of the center of symmetry and/or of the at least one even and/or odd point-symmetric region to rectify a distorted perspective of the camera image.

4. The method as recited in claim 1, wherein: i) in the step of determining, a symmetry type of the at least one center of symmetry is determined, the symmetry type representing an even point symmetry and/or an odd point symmetry, and/or ii) in the step of performing, a comparison of the symmetry type of the at least one center of symmetry in the camera image with a predefined symmetry type of at least one reference center of symmetry in a reference image being performed in order to check an agreement between the at least one center of symmetry and the at least one reference symmetry center.

5. The method as recited in claim 4, wherein the image data read in in the step of reading in represents a camera image of at least one pattern from a plurality of predefined even and/or odd point-symmetric regions, wherein in the step of determining a geometric configuration of centers of symmetry of the at least one pattern is determined, a geometric sequence of symmetry types of the centers of symmetry is determined, and/or, using the sequence, a pattern is determined from a plurality of predefined patterns, the configuration and/or the sequence representing an identification code of the pattern.

6. The method as recited in claim 5, wherein in the step of determining, using the configuration of the centers of symmetry of the at least one pattern and/or the sequence of symmetry types of the centers of symmetry, an item of implicit additional information of the at least one pattern or a readout rule for reading out an item of explicit additional information in the camera image is determined, the configuration and/or the sequence representing the additional information in coded form, the additional information being related to the calibration of the camera.

7. The method as recited in claim 6, wherein in the step of performing, as a function of the determined configuration, the determined sequence, and/or the determined pattern, the reference image is selected from a plurality of stored reference images or is generated using a stored generating rule.

8. The method as recited in claim 5, wherein the step of determining and/or the step of performing is carried out jointly for all centers of symmetry independently of the type of symmetry of the centers of symmetry, or is carried out separately for the centers of symmetry of the same type of symmetry as a function of the type of symmetry of the centers of symmetry.

9. A method for calibrating a camera, the method comprising the following steps:
evaluating calibration data to generate a control signal as a function of the calibration data, the calibration data being provided by:
reading in image data provided by the camera from an interface to the camera, the image data representing a camera image of at least one predefined even and/or odd point-symmetric region in an environment of the camera,
determining at least one center of symmetry of the at least one even and/or odd point-symmetric region using the image data and a determination rule,
performing a comparison of a position of the at least one center of symmetry in the camera image with a predefined position of at least one reference center of symmetry in a reference image relative to a reference coordinate system to determine a positional deviation between the center of symmetry and the reference center of symmetry, and
ascertaining displacement information for at least a subset of pixels of the camera image relative to corresponding pixels of the reference image using the positional deviation, the calibration data being provided using the displacement information; and
outputting the control signal to an interface to the camera or to a calibration device of the camera to calibrate the camera.

10. A device configured to provide calibration data for calibrating a camera, the device configured to:
read in image data provided by the camera from an interface to the camera, the image data representing a camera image of at least one predefined even and/or odd point-symmetric region in an environment of the camera;
determine at least one center of symmetry of the at least one even and/or odd point-symmetric region using the image data and a determination rule;
perform a comparison of a position of the at least one center of symmetry in the camera image with a predefined position of at least one reference center of symmetry in a reference image relative to a reference coordinate system to determine a positional deviation between the center of symmetry and the reference center of symmetry; and
ascertain displacement information for at least a subset of pixels of the camera image relative to corresponding pixels of the reference image using the positional deviation, the calibration data being provided using the displacement information.

11. A non-transitory machine-readable storage medium on which is stored a computer program for providing calibration data for calibrating a camera, the computer program, when executed by a computer, causing the computer to perform the following steps:
reading in image data provided by the camera from an interface to the camera, the image data representing a camera image of at least one predefined even and/or odd point-symmetric region in an environment of the camera;
determining at least one center of symmetry of the at least one even and/or odd point-symmetric region using the image data and a determination rule;
performing a comparison of a position of the at least one center of symmetry in the camera image with a predefined position of at least one reference center of symmetry in a reference image relative to a reference coordinate system to determine a positional deviation between the center of symmetry and the reference center of symmetry; and
ascertaining displacement information for at least a subset of pixels of the camera image relative to corresponding pixels of the reference image using the positional deviation, the calibration data being provided using the displacement information.

12. The method as recited in claim 1, wherein the at least one even and/or odd point-symmetric region is produced by generating design data that represent a graphical representation of the at least one predefined even and/or odd point-symmetric region.

13. The method as recited in claim 12, wherein:
the generated design data provide a graphical representation of the at least one predefined even and/or odd point-symmetric region as a circle, an ellipse, a square, a rectangle, a pentagon, a hexagon, a polygon, or a circular ring; and
at least one of:
a) the at least one predefined even and/or odd point-symmetric region has a regular or quasi-random content pattern; and
b) a first half of a surface of the at least one predefined even and/or odd point-symmetric region is arbitrarily specified and a second half of the surface is constructed by at least one of point mirroring, inversion of gray values, and color values.

14. The method as recited in claim 12, wherein the generated design data provide (i) a graphical representation of at least one pattern with hierarchical symmetry and/or (ii) a graphical representation of at least one pattern from a plurality of predefined even and/or odd point-symmetric regions, at least a subset of point-symmetric regions being aligned on a regular or irregular grid, being directly adjacent to each other, and/or being partially separated from at least one adjacent even and/or odd point-symmetric region by an intervening space, being identical to or different from each other with regard to their dimensions and/or their content patterns, and/or being situated in a common plane or in different planes.

15. The method as recited in claim 1, wherein the at least one even and/or odd point-symmetric region is generated using design data that graphically represent the at least one predefined even and/or odd point-symmetric region on, at, or in a display medium.

16. The method as recited in claim 15, wherein at least one of:
   i) the generation of the at least one even and/or odd point-symmetric region is performed by an additive manufacturing process or cutting or coating or forming or master forming or optical display; and
   ii) the display medium includes glass or stone or ceramic or plastic or rubber or metal or concrete or plaster or paper or cardboard or food or an optical display device.

17. The method as recited in claim 15, wherein the graphical representation is of (i) at least one pattern with hierarchical symmetry and/or (ii) at least one pattern from a plurality of predefined even and/or odd point-symmetric regions, at least a subset of point-symmetric regions being aligned on a regular or irregular grid, being directly adjacent to each other, and/or being partially separated from at least one adjacent even and/or odd point-symmetric region by an intervening space, being identical to or different from each other with regard to their dimensions and/or their content patterns, and/or being situated in a common plane or in different planes.

* * * * *